US012585091B2

(12) United States Patent
Yao

(10) Patent No.: US 12,585,091 B2
(45) Date of Patent: Mar. 24, 2026

(54) CAMERA INCLUDING TWO LIGHT FOLDING ELEMENTS

(71) Applicant: Apple Inc., Cupertino, CA (US)

(72) Inventor: Yuhong Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 16/932,602

(22) Filed: Jul. 17, 2020

(65) Prior Publication Data

US 2021/0026117 A1     Jan. 28, 2021

Related U.S. Application Data

(60) Provisional application No. 62/877,267, filed on Jul. 22, 2019.

(51) Int. Cl.
G02B 13/00     (2006.01)
G02B 9/34     (2006.01)
(Continued)

(52) U.S. Cl.
CPC .......... G02B 13/0065 (2013.01); G02B 9/34 (2013.01); G02B 9/60 (2013.01); G02B 17/023 (2013.01);
(Continued)

(58) Field of Classification Search
CPC ........ G02B 13/0065; G02B 9/34; G02B 9/60; G02B 17/023; G02B 7/09; G02B 17/04;
(Continued)

(56) References Cited

U.S. PATENT DOCUMENTS

| 2,649,022 A | 8/1953 | Angenieux |
| 3,948,584 A | 4/1976 | Basista et al. |
| | (Continued) | |

FOREIGN PATENT DOCUMENTS

| CN | 202886720 | 4/2013 |
| CN | 104765234 | 7/2015 |
| | (Continued) | |

OTHER PUBLICATIONS

Crop Factor Explained, 2011, pp. 1-8 [online], [retrieved on Oct. 20, 2022], retrieved from the Internet <URL: https://www.photographymad. com/pages/view/crop-factor-explained#:~:text=If%20you%20multiply% 20a%20lens's,(or%20%22FLM%22).>. (Year: 2011).*
(Continued)

*Primary Examiner* — Jie Lei
(74) *Attorney, Agent, or Firm* — Robert C. Kowert; Kowert, Hood, Munyon, Rankin & Goetzel, P.C.

(57) ABSTRACT

An optical system includes a first light folding element (e.g., a prism), a second light folding element (e.g., another prism or a mirror), and a lens system located between the first light folding element and the second light folding element. In some cases, the lens system includes a lens stack having either four or five lens elements with refractive power. The first light folding element redirects light from an object field from a first axis to the lens system on a second axis. The plurality of refractive lens elements in the lens stack refract the light to the second light folding element. The second light folding element redirects the light from the second axis onto a third axis to form an image of the object field at an image plane. The optical system has a 35 mm equivalent focal length within a range of 85 to 160 mm.

23 Claims, 23 Drawing Sheets

(51) Int. Cl.

| | | |
|---|---|---|
| *G02B 9/60* | (2006.01) |
| *G02B 17/02* | (2006.01) |
| *G02B 17/04* | (2006.01) |
| *G02B 7/09* | (2021.01) |
| *G02B 27/64* | (2006.01) |
| *G03B 5/00* | (2021.01) |
| *G03B 13/36* | (2021.01) |

(52) U.S. Cl.
CPC .............. *G02B 17/04* (2013.01); *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
CPC ...... G02B 27/646; G02B 5/00; G02B 13/004; G02B 13/0045; G02B 30/00; G02B 13/00; G02B 17/02; G02B 7/02; G02B 7/04; G02B 7/10; G02B 27/64; G03B 13/36; G03B 2205/0007; G03B 3/10; G03B 2205/0015; G03B 17/17; G03B 5/00; G03B 5/04; G03B 30/00; G03B 2205/0069
USPC ....... 359/734, 557, 554, 819, 823, 833, 850; 396/55, 75, 77, 52
See application file for complete search history.

(56) References Cited

U.S. PATENT DOCUMENTS

| | | | | |
|---|---|---|---|---|
| 4,047,222 | A | 9/1977 | Moskovich et al. | |
| 4,299,454 | A | 11/1981 | Betensky | |
| 6,850,279 | B1* | 2/2005 | Scherling | G02B 13/0015 |
| | | | | 348/E5.025 |
| 7,274,518 | B1 | 9/2007 | Tang et al. | |
| 7,646,418 | B2 | 1/2010 | Nanjo | |
| 8,014,080 | B1 | 9/2011 | Chen et al. | |
| 8,427,761 | B2 | 4/2013 | Yamada | |
| 8,599,495 | B1 | 12/2013 | Tsai et al. | |
| 8,837,929 | B2 | 9/2014 | Nomura et al. | |
| 9,172,856 | B2 | 10/2015 | Bohn et al. | |
| 9,274,311 | B2 | 3/2016 | Bone et al. | |
| 9,374,516 | B2 | 6/2016 | Osborne | |
| 9,549,107 | B2 | 1/2017 | Georgiev | |
| 9,733,458 | B2 | 8/2017 | Georgiev et al. | |
| 9,829,684 | B2 | 11/2017 | Shabtay et al. | |
| 9,973,680 | B2 | 5/2018 | Osborne | |
| 10,070,060 | B2 | 9/2018 | Goldenberg et al. | |
| 10,126,633 | B2 | 11/2018 | Avivi et al. | |
| 10,139,594 | B2 | 11/2018 | Lin et al. | |
| 10,156,706 | B2 | 12/2018 | Shabtay et al. | |
| 10,459,205 | B2 | 10/2019 | Goldenberg | |
| 2004/0141065 | A1 | 7/2004 | Hara et al. | |
| 2006/0092524 | A1 | 5/2006 | Konno | |
| 2008/0165271 | A1* | 7/2008 | Nakazawa | H04N 23/69 |
| | | | | 348/340 |
| 2008/0297612 | A1* | 12/2008 | Yoshikawa | H04N 23/16 |
| | | | | 348/E5.024 |
| 2012/0075728 | A1 | 3/2012 | Takakubo et al. | |
| 2012/0162787 | A1 | 6/2012 | Adachi et al. | |
| 2012/0249815 | A1 | 10/2012 | Bohn et al. | |
| 2012/0314307 | A1 | 12/2012 | Ikushima et al. | |
| 2013/0100323 | A1* | 4/2013 | Abe | H04N 25/00 |
| | | | | 359/772 |
| 2013/0132044 | A1* | 5/2013 | Paris | G02C 7/028 |
| | | | | 703/2 |
| 2013/0182336 | A1 | 7/2013 | Hsu et al. | |
| 2013/0201559 | A1 | 8/2013 | Minamisawa et al. | |
| 2013/0314307 | A1 | 11/2013 | Lin et al. | |
| 2014/0009843 | A1 | 1/2014 | Tsai | |
| 2015/0042870 | A1 | 2/2015 | Chan et al. | |
| 2015/0198784 | A1* | 7/2015 | Bone | G02B 13/0065 |
| | | | | 359/708 |

| | | | | |
|---|---|---|---|---|
| 2015/0253543 | A1* | 9/2015 | Mercado | H04N 23/00 |
| | | | | 348/370 |
| 2015/0316748 | A1 | 11/2015 | Cheo et al. | |
| 2015/0365568 | A1 | 12/2015 | Topliss et al. | |
| 2015/0373252 | A1 | 12/2015 | Georgiev | |
| 2016/0044247 | A1 | 2/2016 | Shabtay et al. | |
| 2016/0070115 | A1 | 3/2016 | Miller et al. | |
| 2016/0266400 | A1 | 9/2016 | Chan et al. | |
| 2016/0327773 | A1* | 11/2016 | Choi | G02B 27/646 |
| 2016/0353008 | A1 | 12/2016 | Osborne | |
| 2017/0108670 | A1 | 4/2017 | Ko | |
| 2017/0187962 | A1 | 6/2017 | Lee et al. | |
| 2017/0329102 | A1 | 11/2017 | Yuza et al. | |
| 2017/0359566 | A1 | 12/2017 | Goma et al. | |
| 2017/0359568 | A1 | 12/2017 | Georgiev et al. | |
| 2018/0017767 | A1 | 1/2018 | Chen | |
| 2018/0017844 | A1 | 1/2018 | Yu et al. | |
| 2018/0120674 | A1 | 5/2018 | Avivi et al. | |
| 2018/0217475 | A1 | 8/2018 | Goldenberg et al. | |
| 2018/0239162 | A1 | 8/2018 | Lee et al. | |
| 2018/0267271 | A1* | 9/2018 | Tseng | G02B 13/0045 |
| 2019/0056566 | A1* | 2/2019 | Yoo | G02B 9/38 |
| 2019/0086638 | A1* | 3/2019 | Lee | H04N 23/687 |
| 2019/0094500 | A1 | 3/2019 | Tseng et al. | |
| 2019/0196148 | A1 | 6/2019 | Yao et al. | |
| 2019/0212632 | A1 | 7/2019 | Miller et al. | |
| 2019/0227406 | A1 | 7/2019 | Wang et al. | |
| 2019/0235202 | A1 | 8/2019 | Smyth et al. | |
| 2019/0377158 | A1* | 12/2019 | Liao | G02B 9/60 |
| 2020/0341249 | A1 | 10/2020 | Ito | |
| 2021/0333529 | A1 | 10/2021 | Yao et al. | |
| 2023/0314767 | A1* | 10/2023 | Shih | G02B 1/04 |
| | | | | 359/716 |

FOREIGN PATENT DOCUMENTS

| | | | |
|---|---|---|---|
| CN | 105807401 | | 7/2016 |
| CN | 106164766 | A | 11/2016 |
| CN | 106576138 | A | 4/2017 |
| CN | 106597652 | | 4/2017 |
| CN | 107533273 | A | 1/2018 |
| CN | 108627950 | | 10/2018 |
| JP | 2001337266 | | 12/2001 |
| JP | 2008224908 | | 9/2008 |
| JP | 2009526257 | | 7/2009 |
| JP | 2013125057 | A | 6/2013 |
| KR | 20090095819 | A * | 9/2009 |
| KR | 10-20160030059 | | 3/2016 |
| KR | 10-20160042066 | | 4/2016 |
| KR | 10-20170126993 | | 11/2017 |
| KR | 10-20170141816 | | 12/2017 |
| TW | 594037 | | 4/2004 |
| WO | 2006023425 | | 3/2006 |
| WO | 2013154122 | | 10/2013 |
| WO | 2016024192 | A2 | 2/2016 |
| WO | 2016207754 | | 12/2016 |
| WO | 20170137688 | | 3/2017 |
| WO | WO-2017172794 | A1 * | 10/2017 ........... G02B 13/004 |
| WO | 2019097669 | | 5/2019 |

OTHER PUBLICATIONS

Sareesh Sudahakaran, What is the 35mm Equivalent and Why is it Confusing?, 2014, pp. 1-6 [online], [retrieved on Jul. 5, 2022], retrieved from the Internet <URL: https://wolfcrow.com/what-is-the-35mm-equivalent-and-why-is-it-confusion/>. (Year: 2014).*

Todd Vorenkamp, Understanding Crop Factor, 2015, pp. 1-46 [online], [retrieved Nov. 9, 2022], retrieved from the Internet <URL: https://www.phphotovideo.com/explora/photography/tips-and-solutions/understanding-crop-factor>. (Year: 2015).*

Lens Image Circle, Aug. 1, 2019, pp. 1-2 [online], [retrieved Nov. 10, 2022], retrieved from the Internet , URL: https://sunex.com/2019/08/01/lens-image-circle/ >. (Year: 2019).*

Tom Dempsey, Compare digital camera sensor sizes: 1"-Type, ⅓, APS-C, Full Frame 35 mm, 2015, pp. 1-54 [online], [retrieved on Oct. 10, 2022], retrieved from the Internet <URL: http://photoseek.

(56)                    References Cited

OTHER PUBLICATIONS com/2013/compare-digital-camera-sensor-sizes-full-frame-35mm-aps-c-micro-four-thirds-1-inch-type/>. (Year: 2015).*

CIPA DCG-001-Translation-2014, 2014, pp. 1-21 [online], [retrieved Aug. 20, 2023], retrieved from the Internet <URL: https:// www. cipa.jp/e/std/std-sec-guideline.html>. (Year: 2014).*

Top Seven Considerations for Choosing Canon Lenses, 1. Fast vs. Slow Lenses, 2014, pp. 1-4 [online], [retrieved Sep. 18, 2023], retrieved from the Internet <URL: https://www.peachpit.com/articles/article.aspx?p=2264647&seqNum=4>. (Year: 2014).*

Focal Lengths, Apertures and F/Numbers, 2016, pp. 1-2 [online], [retrieved May 3, 2023], retrieved from the Internet <URL: https:// spacemath.gsfc.nasa.gov/weeky/10Page30.pdf>. (Year: 2016).*

Chris George, World's Smallest Camera is the Size of a Grain of Sand, 2020, pp. 1-11 [online], [retrieved Sep. 27, 2023], retrieved from the Internet <URL: https://www.digitalcameraworld.com/news/worlds-smallest-camera-is-the-size-of-a-grain-of-sand>. (Year: 2020).*

Camera & Imaging Products Association 2023-2024, 2023, pp. 1-8 [online], [retrieved Sep. 16, 2023], retrieved from the Internet <URL: https://www.cipa.jp/guide/documents/e/cipaguide202306_e. pdf>. (Year: 2023).*

Herbert Gross (Ed.), Handbook of Optical Systems, vol. 3: Aberration Theory and Correction of Optical Systems 377-379 (2007). (Year: 2007).*

The Microscopic Scale, 2012, pp. 1-4 [online], [retrieved Jul. 26, 2024], retrieved from the Internet <URL: https://web.archive.org/ web/20170508132008/https://www.sciencelearn.org.nz/resources/ 497-the-microscopic-scale>. (Year: 2012).*

Lens Material and Design, 2015, pp. 1-19 [online], [retrieved Feb. 26, 2024], retrieved from the Internet <URL: https:www.nao.org/ wp-content/uploads/2020/04/Lens-Material-and-Design.pdf>. (Year: 2015).*

In re Kroekel, 504 F.2d 1143-47 (C.C.P.A. 1973). (Year: 1973).*

In re Kirsch, 498 F.2d 1389-1394 (C.C.P.A. 1974). (Year: 1974).*

G. I. Greĭsukh et al., Layout and Design of a Periscope-type Refraction-diffraction Objective for a Mobile Communication Device, 83 Journal of Optical Technology 687-691 (2016). (Year: 2016).*

Ex Parte Qiu (Appeal 2020-001512), mailed Nov. 25, 2020, pp. 1-4. (Year: 2020).*

Invitation to pay additional Fees from PCT/US2020/042823, dated Oct. 30, 2020, pp. 1-10.

U.S. Appl. No. 16/264,463, filed Jan. 31, 2019, Yuhong Yao et al.

International Search report and Written Opinion from PCT/US2020/ 042823, dated Dec. 21, 2020, pp. 1-17.

CIPA DCG-001-Translation-2018 Individual Guidelines for noting digital camera specifications on Number of pixels, Image file and Focal length of the lens, downloaded from https://www.cipa.jp/std/ documents/download_e.html?DCG-001-2018_E, 2018, pp. 1-26.

Office Action and Search Report from Chinese Patent Application No. 202080052844.4, dated Dec. 7, 2023, pp. 1-16.

Office Action and Search Report from Chinese Patent Application No. 202080052844.4, dated Apr. 12, 2024, pp. 1-10.

Rejection Decision from Chinese Patent Application No. 202080052844. 4, dated Jun. 28, 2024, pp. 1-4 (no english translation).

* cited by examiner

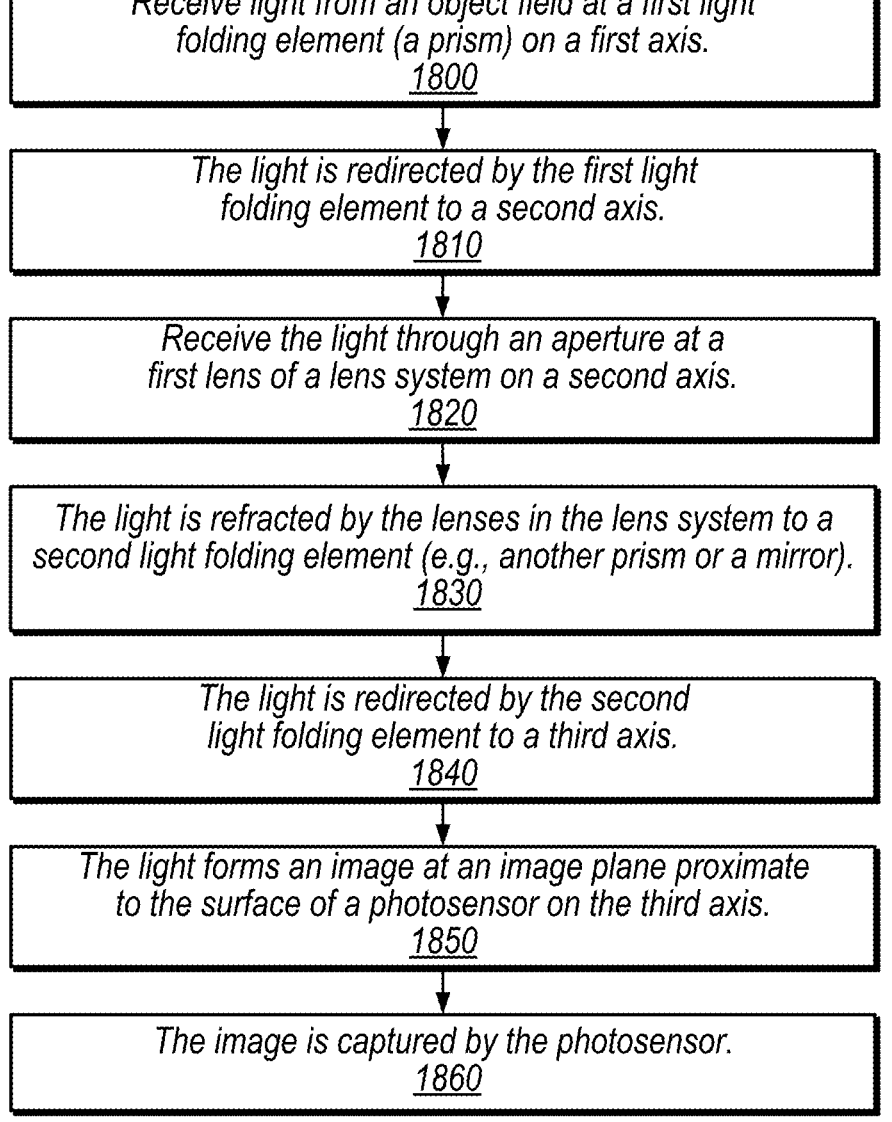

Receive light from an object field at a first light
folding element (a prism) on a first axis.
_1800_

↓

The light is redirected by the first light
folding element to a second axis.
_1810_

↓

Receive the light through an aperture at a
first lens of a lens system on a second axis.
_1820_

↓

The light is refracted by the lenses in the lens system to a
second light folding element (e.g., another prism or a mirror).
_1830_

↓

The light is redirected by the second
light folding element to a third axis.
_1840_

↓

The light forms an image at an image plane proximate
to the surface of a photosensor on the third axis.
_1850_

↓

The image is captured by the photosensor.
_1860_

*FIG. 18*

CAMERA INCLUDING TWO LIGHT FOLDING ELEMENTS

This application claims benefit of priority to U.S. Provisional Application No. 62/877,267, filed Jul. 22, 2019, titled "Camera Including Two Light Folding Elements", which is hereby incorporated by reference in its entirety.

BACKGROUND

Technical Field

This disclosure relates generally to camera systems, and more specifically to small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a folded camera that may, for example, be used in small form factor cameras. Embodiments of a folded camera are described that include two light folding elements (e.g., two prisms, or one prism and a mirror) and a lens system located between the two light folding elements. The camera may be a telephoto camera. The lens system may be independent from the light folding elements. The lens system may include an aperture stop and lens elements with refractive power mounted in a lens barrel. The light folding elements and lens system may collectively be referred to as an optical system. Either two prisms or one prism and a mirror provide a "folded" optical axis for the camera, for example to reduce the Z-height of the camera. The lens system includes a lens stack including multiple refractive lens elements mounted in a lens barrel, and an aperture stop positioned between a front surface of a first refractive lens element (located on an object side of the lens system) and a front surface of a second refractive lens element of the lens system. In some embodiments, the lens stack includes only four refractive lens elements. In other embodiments, the lens stack includes only five refractive lens elements. The first light folding element (a prism) redirects light from an object field from a first axis (AX 1) to the lens system on a second axis (AX 2). The lens elements in the lens stack receive the light through the aperture stop and refract the light to the second light folding element (e.g., another prism or a mirror) that redirects the light onto a third axis (AX 3) on which a photosensor of the camera is disposed. The redirected light forms an image plane at or near the surface of the photosensor.

The shapes, materials, and arrangements of the refractive lens elements in the lens stack may be selected to capture high resolution, high quality images. Parameters and relationships of the lenses in the lens stack, including but not limited to lens shape, thickness, geometry, position, materials, spacing, and the surface shapes of certain lens elements, may be selected at least in part to reduce, compensate, or correct for optical aberrations and lens artifacts and effects across the field of view. In some embodiments, arrangements of power distribution, lens shapes, prism form factors, and lens materials may be selected to ensure that embodiments of the lens system provide low F-number (e.g., <=3.5, such as in a range of 2.8 to 3.5), 4~6× optical zoom (e.g., 5× optical zoom), and high resolution imaging.

The lens system may be configured in the camera to move on one or more axes independently of the prism(s)/mirror(s). The camera may include an actuator component configured to move the lens system on (parallel to) the second axis (AX 2) relative to and independently of the prisms to provide autofocus functionality for the camera. In some embodiments, the actuator may instead or also be configured to move the lens system on one or more axes perpendicular to the second axis (AX 2) relative to and independently of the prism(s)/mirror(s) to provide optical image stabilization (OIS) functionality for the camera. In some embodiments, one or both of the light folding elements (e.g., prism(s) and/or mirror) may be translated with respect to the second axis (AX 2) independently of the lens system and/or tilted with respect to the second axis (AX 2) independently of the lens system, for example to provide OIS functionality for the camera or to shift the image formed at an image plane at the photosensor.

In some embodiments, such as when the second light folding element is a prism, the lens system may include a lens stack having four lens elements with refractive power, in order from an object side to an image side: a first lens element with positive refractive power for converging light and an aspheric shape to correct spherical aberration, having an Abbe number that is greater than 50; a second lens element with negative refractive power and a meniscus shape to correct field curvature, having an Abbe number that is less than 30; a third lens element with a meniscus shape and having a concave object-side surface in a paraxial region and a convex image-side surface in the paraxial region; and a fourth lens element with a meniscus shape.

In some embodiments, such as when the second light folding element is a mirror, the lens system may include a lens stack having four lens elements with refractive power, in order from the object side to the image side: a first lens element with positive refractive power for converging light and an aspheric shape to correct spherical aberration, having an Abbe number that is greater than 50; a second lens element with negative refractive power and a meniscus shape to correct field curvature, having an Abbe number that is less than 30; a third lens element with a meniscus shape and having a concave object-side surface in a paraxial region and a convex image-side surface in the paraxial region; and a fourth lens element with refractive power.

In some embodiments, such as when the second light folding element is a prism, the lens system may include a lens stack having five lens elements with refractive power, in order from the object side to the image side: a first lens element with positive refractive power for converging light and an aspheric shape to correct spherical aberration, having an Abbe number that is greater than 50; a second lens element with negative refractive power, having an Abbe number that is less than 30; a third lens element with a meniscus shape and having a convex object-side surface in a paraxial region and a concave image-side surface in the paraxial region, to correct field curvature and astigmatism; a fourth lens element with refractive power; and a fifth lens element with refractive power, having a meniscus shape in the paraxial region and/or having an aspheric form for both the object-side surface and the image-side surface.

In some embodiments, such as when the second light folding element is a mirror, the lens system may include a lens stack having five lens elements with refractive power, in order from the object side to the image side: a first lens element with positive refractive power for converging light and an aspheric shape to correct spherical aberration, having an Abbe number that is greater than 50; a second lens element with negative refractive power, having an Abbe number that is less than 30; a third lens element with a meniscus shape and having a convex object-side surface in a paraxial region and a concave image-side surface in the paraxial region, to correct field curvature and astigmatism; a fourth lens element with refractive power; and a fifth lens element with refractive power, having a meniscus shape in the paraxial region and/or having an aspheric form for both the object-side surface and the image-side surface.

An aperture stop may be located in the lens system for controlling the brightness of the camera. The aperture stop may be positioned between a front surface of a first refractive lens element located on an object side of the lens system and a front surface of a second refractive lens element of the lens system. Note that the power order, shape, or other optical characteristics of the refractive lens elements may be different in some embodiments, and some embodiments may include more or fewer refractive lens elements. In some embodiments, the folded camera may include an infrared (IR) filter to reduce or eliminate interference of environmental noise on the photosensor. The IR filter may, for example, be located between the second light folding element (e.g., a second prism or a mirror) and the photosensor.

4

Figure 3:
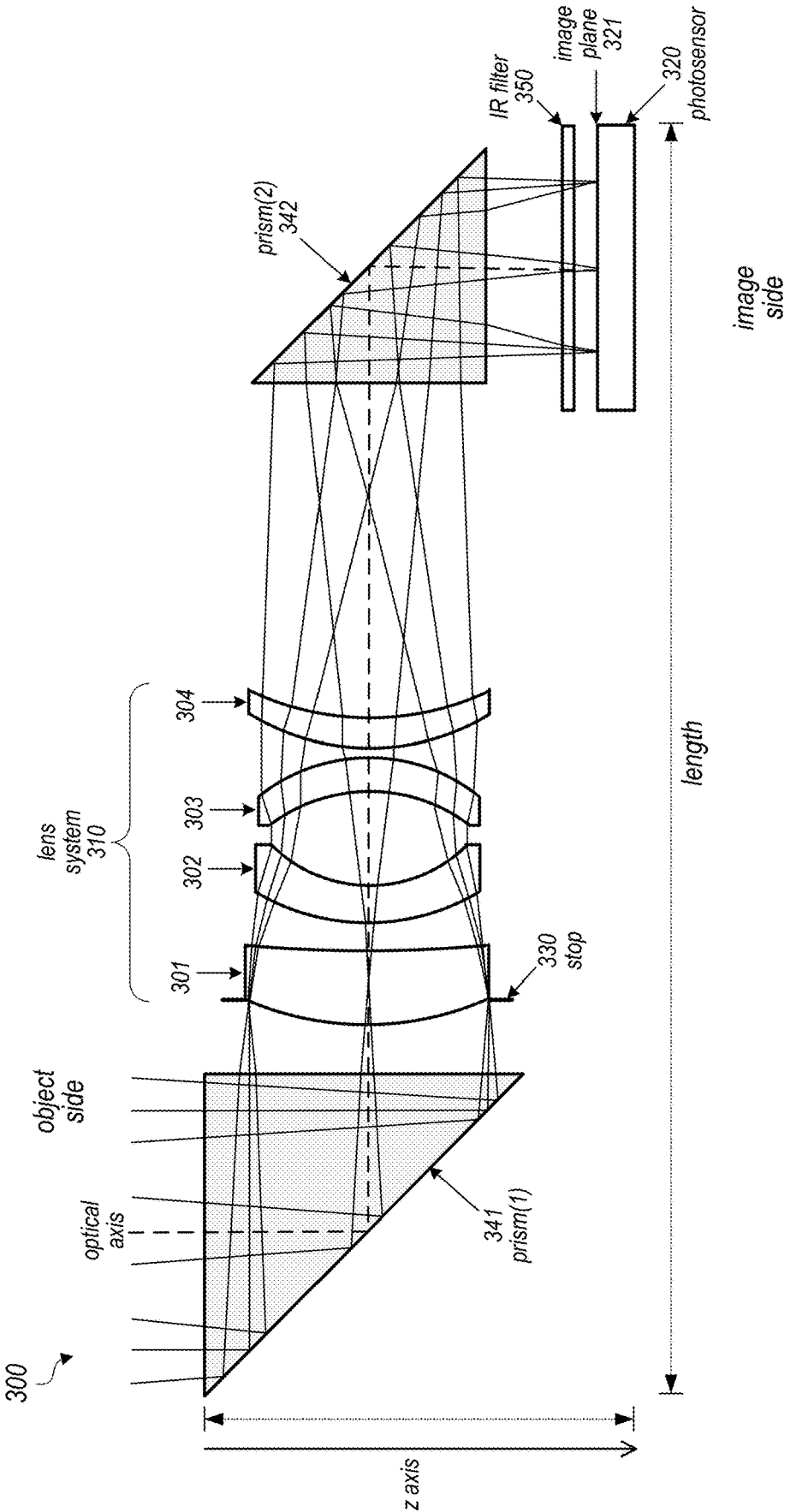
FIG. 3 is a diagram illustrating a first example of a lens system that includes four refractive lens elements to be positioned between a first light folding element (a first prism) and a second light folding element (a second prism), according to some embodiments.
Figures 4A, 4B:
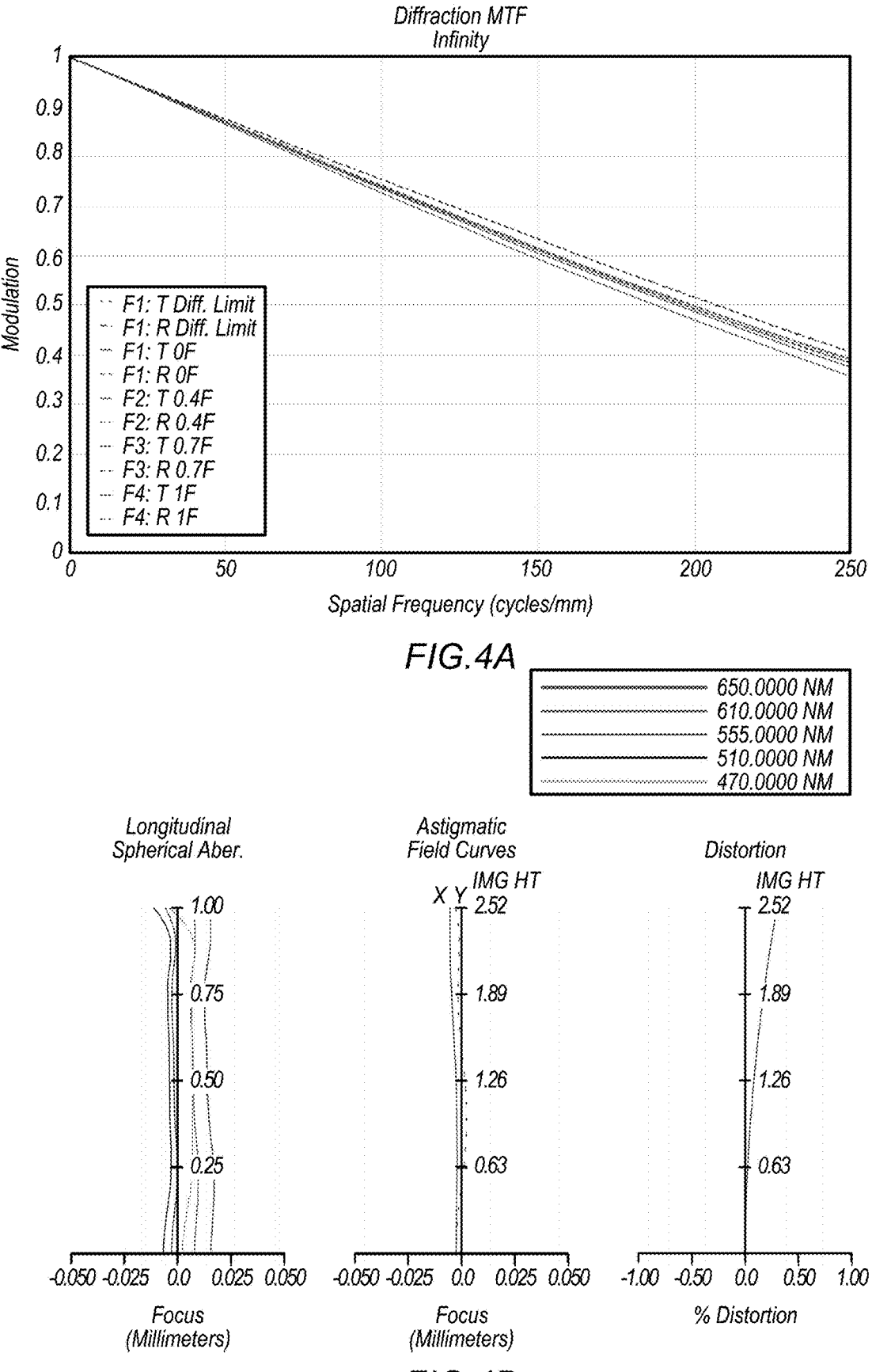

FIG. 4A is a graph illustrating a modulation transfer function (MTF) for a lens system as illustrated in FIG. 3 at infinity conjugate.

FIG. 4B shows longitudinal spherical aberration, astigmatic field curves, and distortion for a lens system as illustrated in FIG. 3 at infinity conjugate.

Figures 5A, 5B:
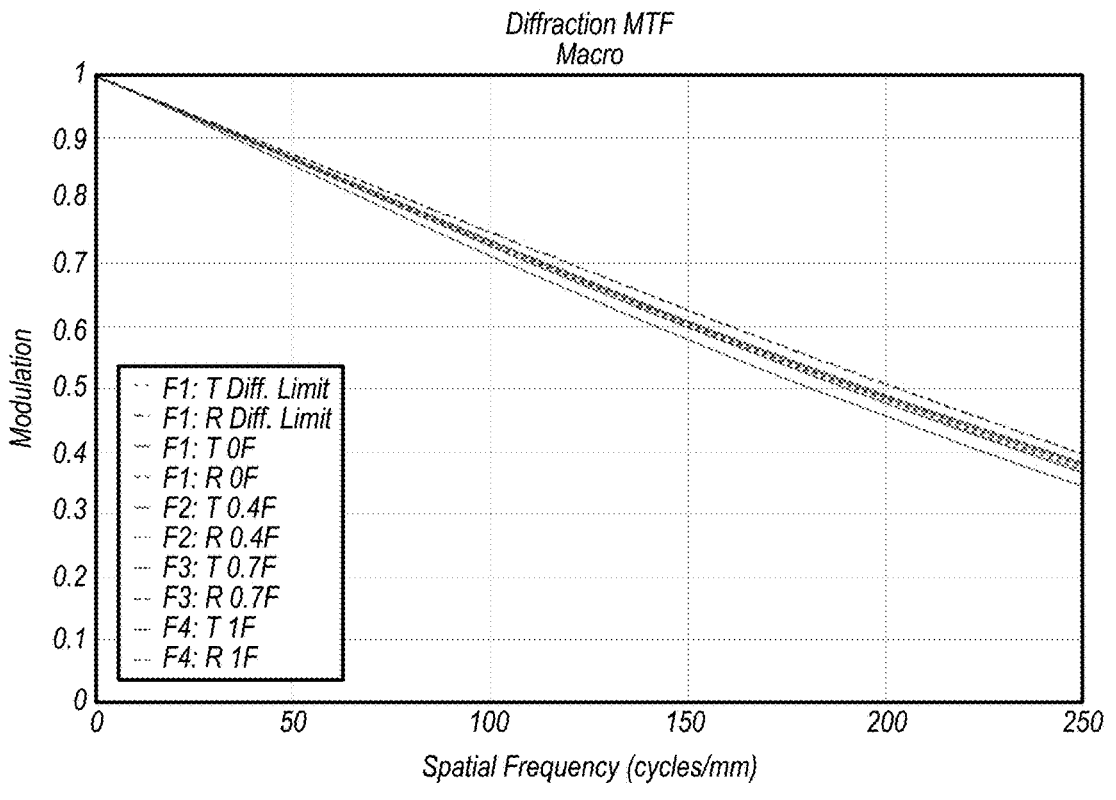

FIG. 5A is a graph illustrating a modulation transfer function (MTF) for a lens system as illustrated in FIG. 3 at macro conjugate.

FIG. 5B shows longitudinal spherical aberration, astigmatic field curves, and distortion for a lens system as illustrated in FIG. 3 at macro conjugate.

Figure 6:
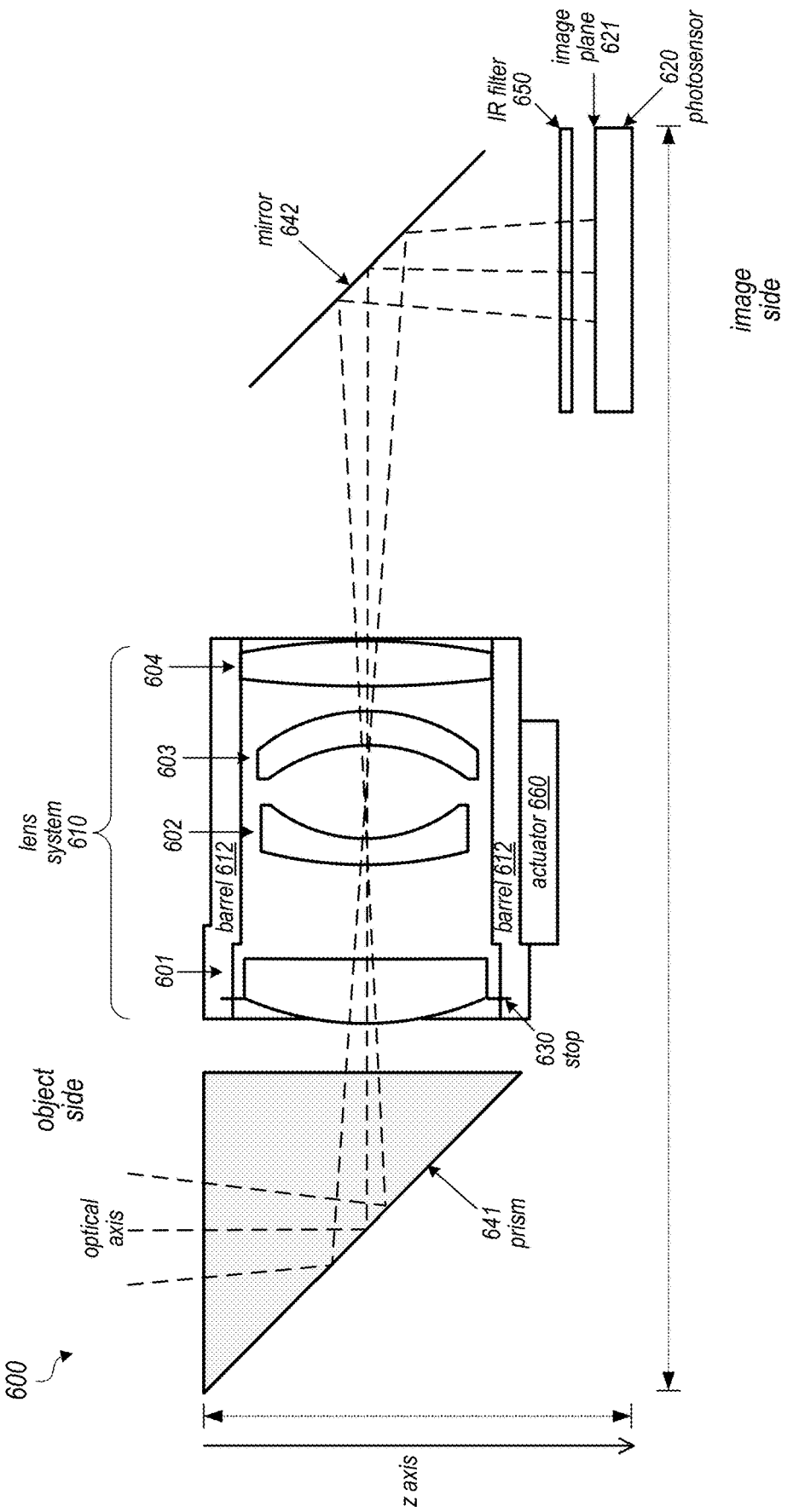

FIG. 6 is a cross-sectional illustration of a second example of a folded camera having four refractive lens elements in the lens system and a mirror as the second light folding element, according to some embodiments.

Figure 7:
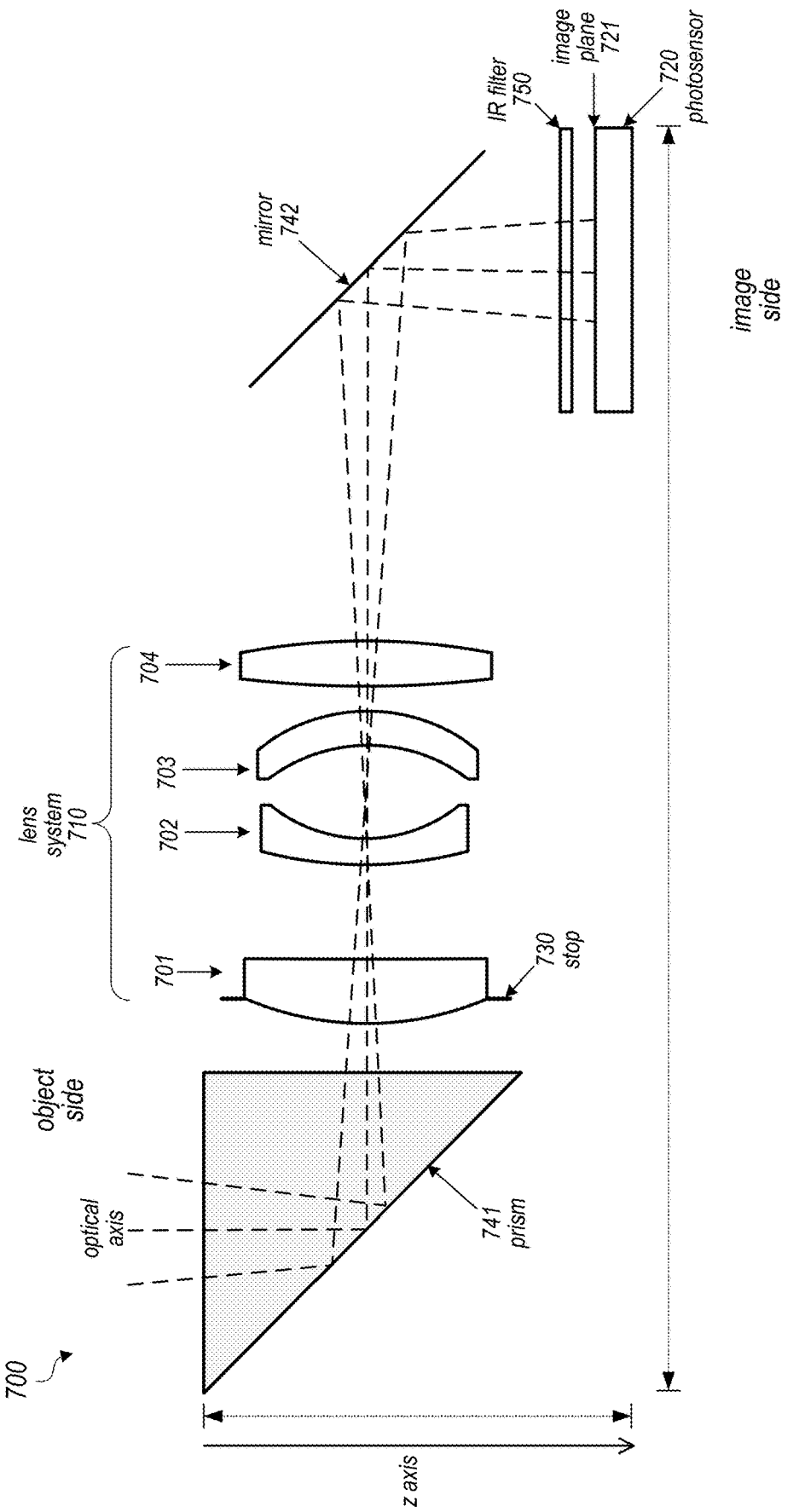

FIG. 7 is a diagram illustrating a second example of a lens system that includes four refractive lens elements to be positioned between a first light folding element (a prism) and a second light folding element (a mirror), according to some embodiments.

Figure 8A:
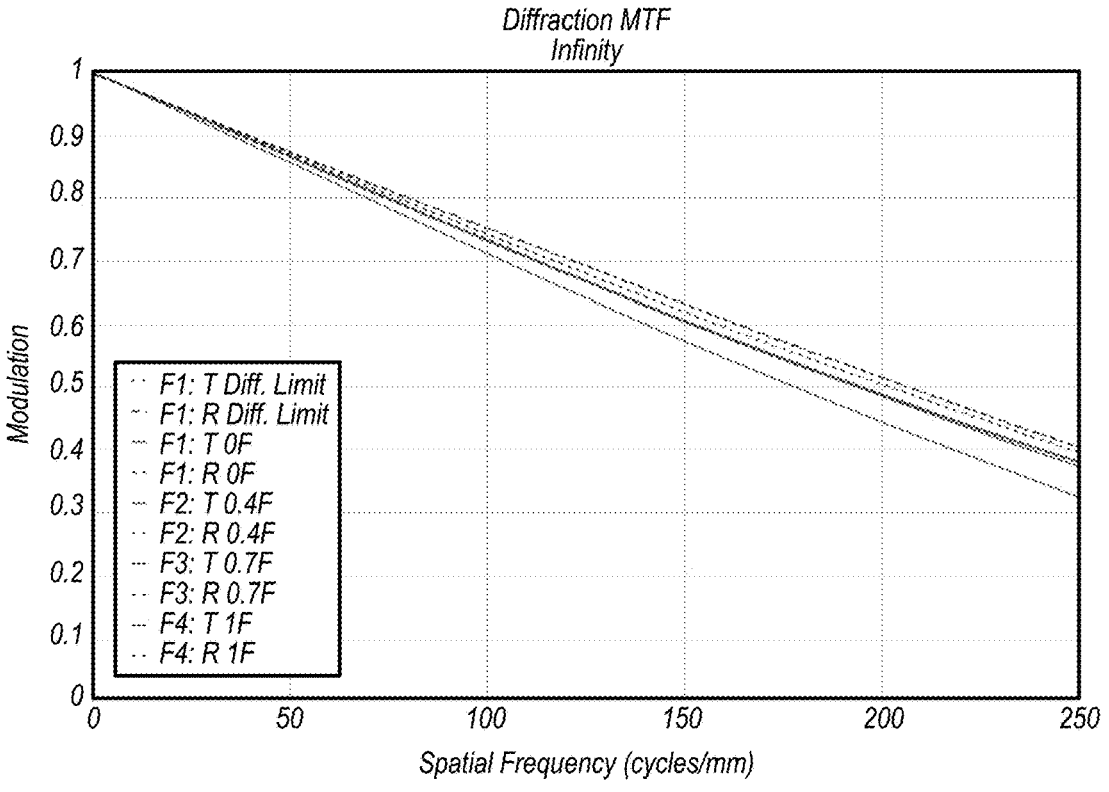

FIG. 8A is a graph illustrating a modulation transfer function (MTF) for a lens system as illustrated in FIG. 7 at infinity conjugate.

Figure 8B:
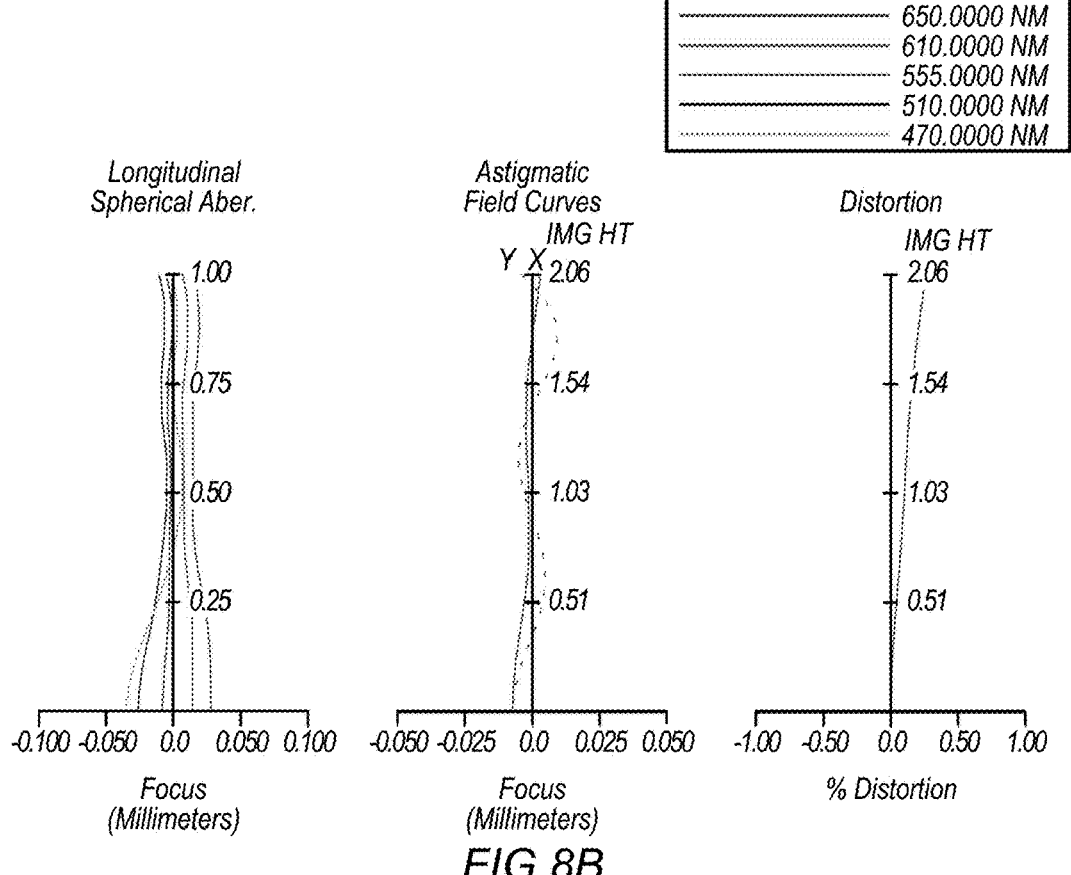

FIG. 8B shows longitudinal spherical aberration, astigmatic field curves, and distortion for a lens system as illustrated in FIG. 7 at infinity conjugate.

Figure 9A:
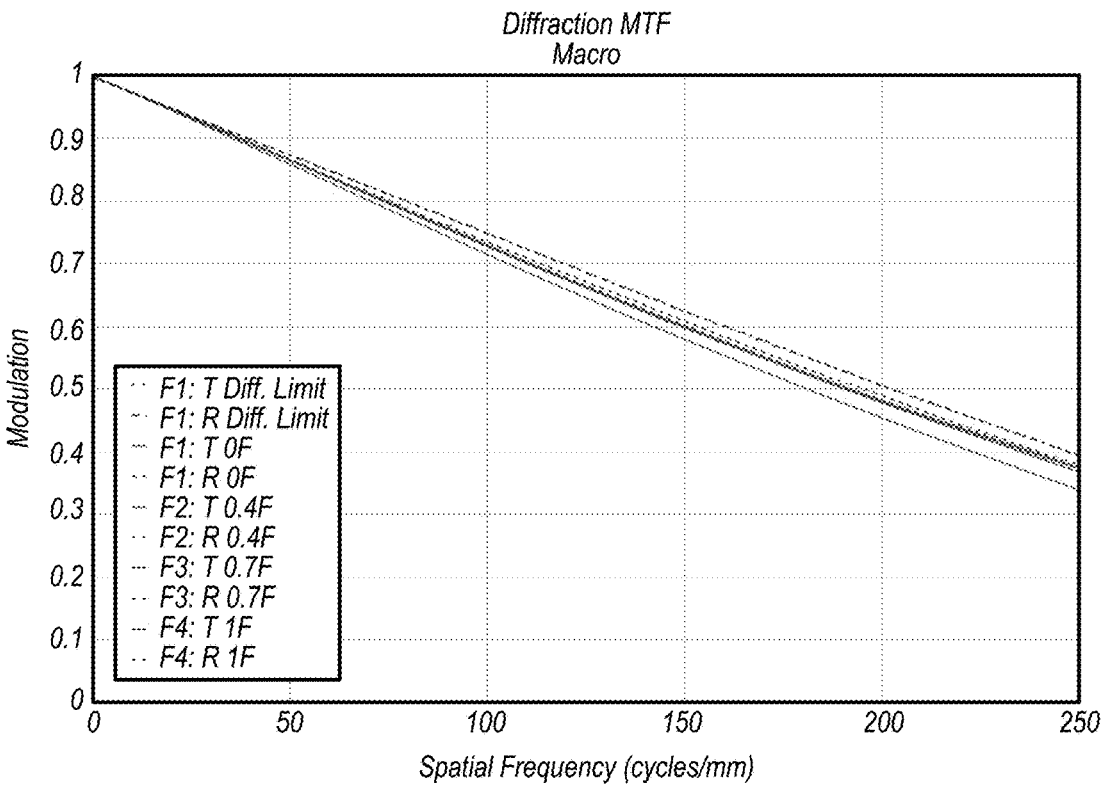

FIG. 9A is a graph illustrating a modulation transfer function (MTF) for a lens system as illustrated in FIG. 7 at macro conjugate.

Figure 9B:
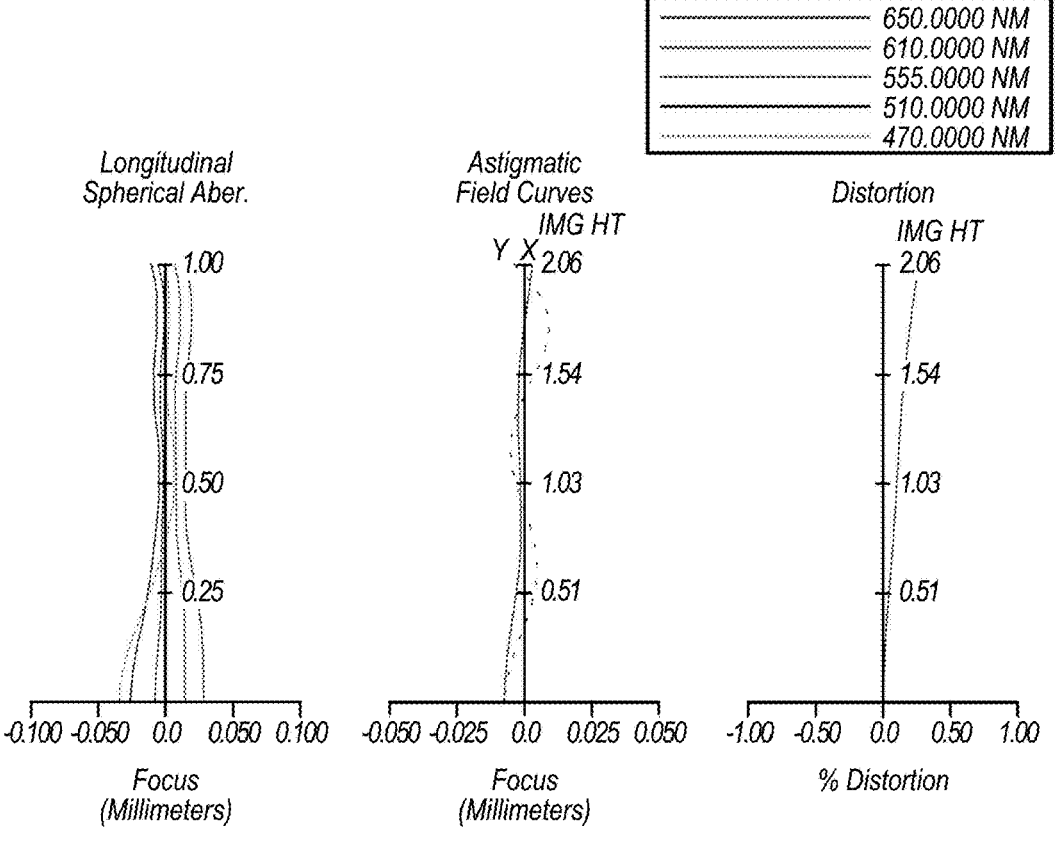

FIG. 9B shows longitudinal spherical aberration, astigmatic field curves, and distortion for a lens system as illustrated in FIG. 7 at macro conjugate.

Figure 10:
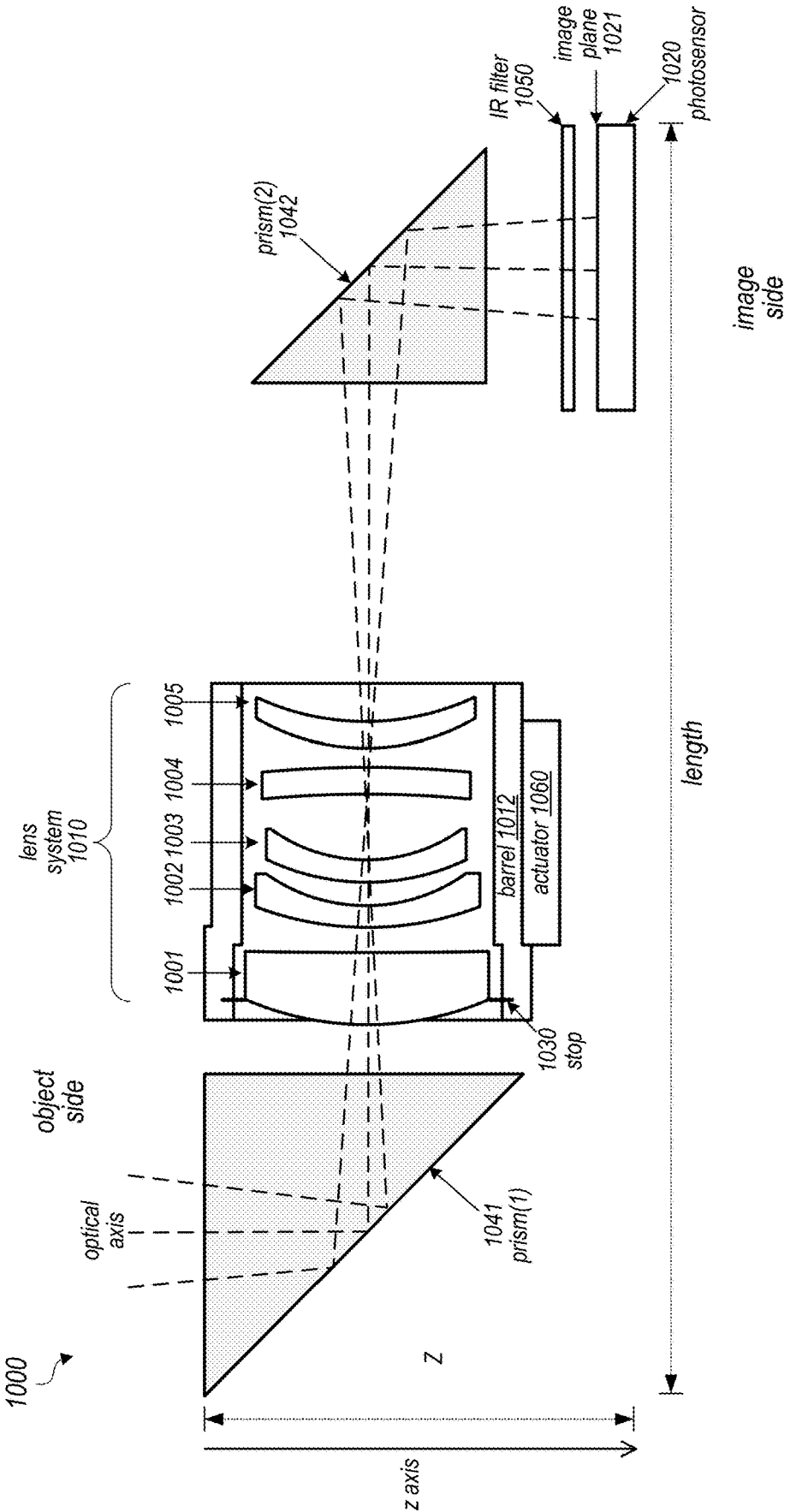

FIG. 10 is a cross-sectional illustration of a third example of a folded camera having five refractive lens elements in the lens system and a prism as the second light folding element, according to some embodiments.

Figure 11:
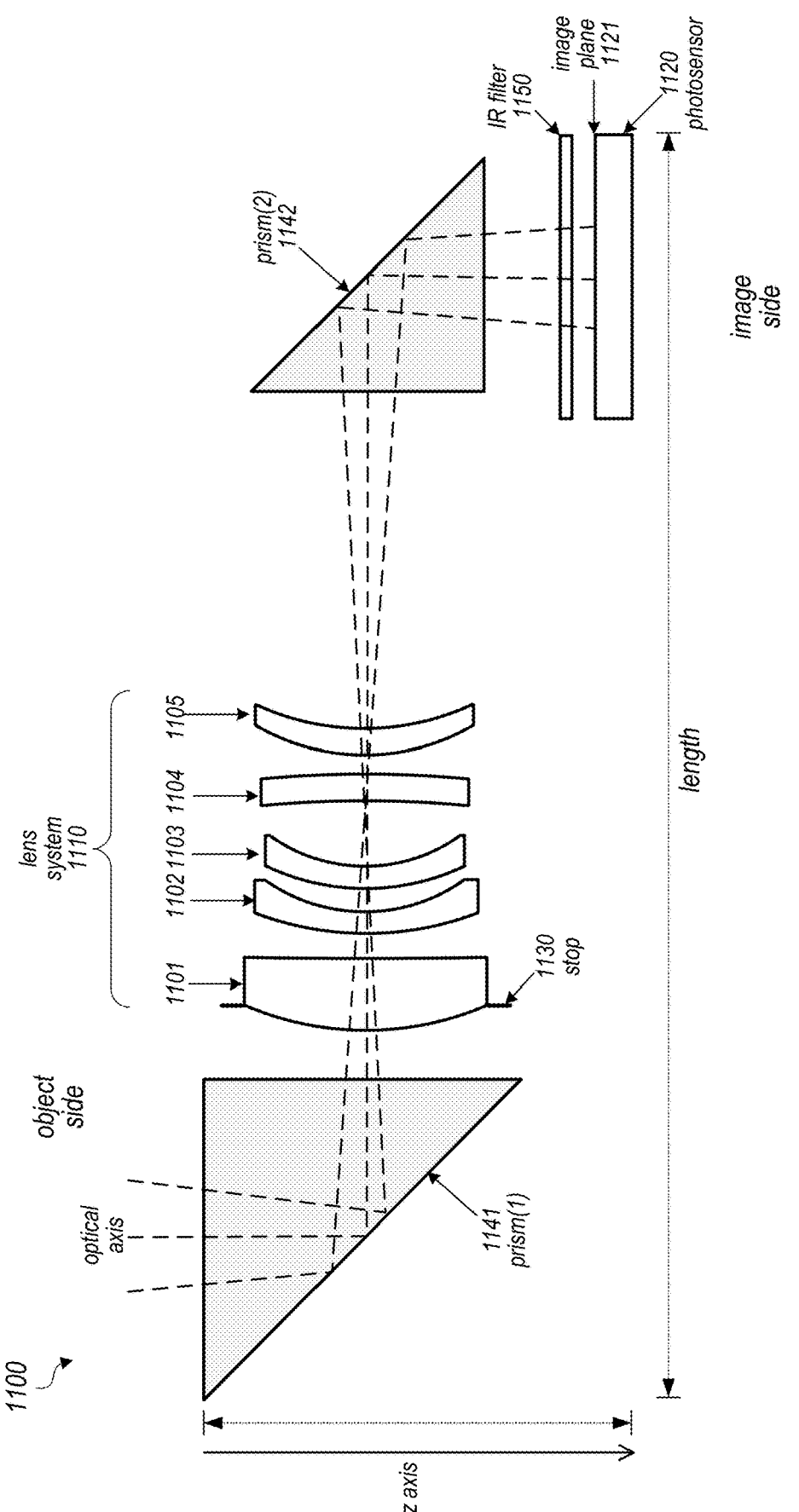

FIG. 11 is a diagram illustrating a third example of a lens system that includes five refractive lens elements to be positioned between a first light folding element (a first prism) and a second light folding element (a second prism), according to some embodiments.

Figure 12A:
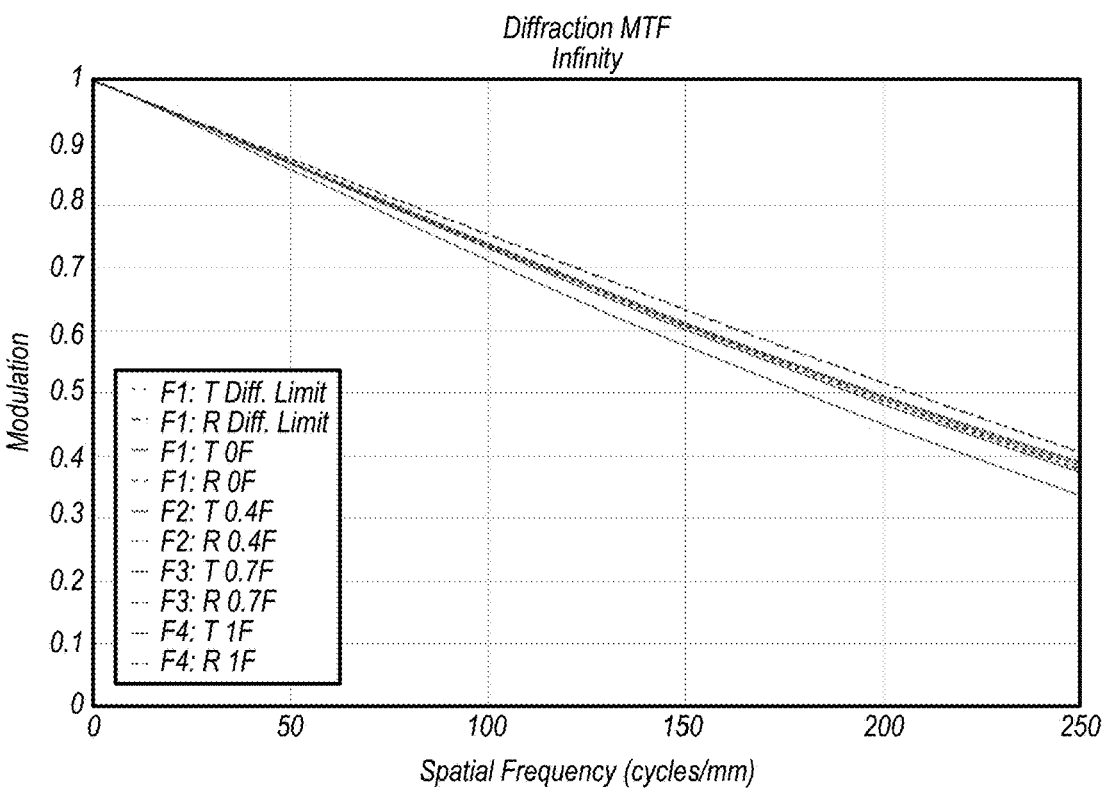

FIG. 12A is a graph illustrating a modulation transfer function (MTF) for a lens system as illustrated in FIG. 11 at infinity conjugate.

Figure 12B:
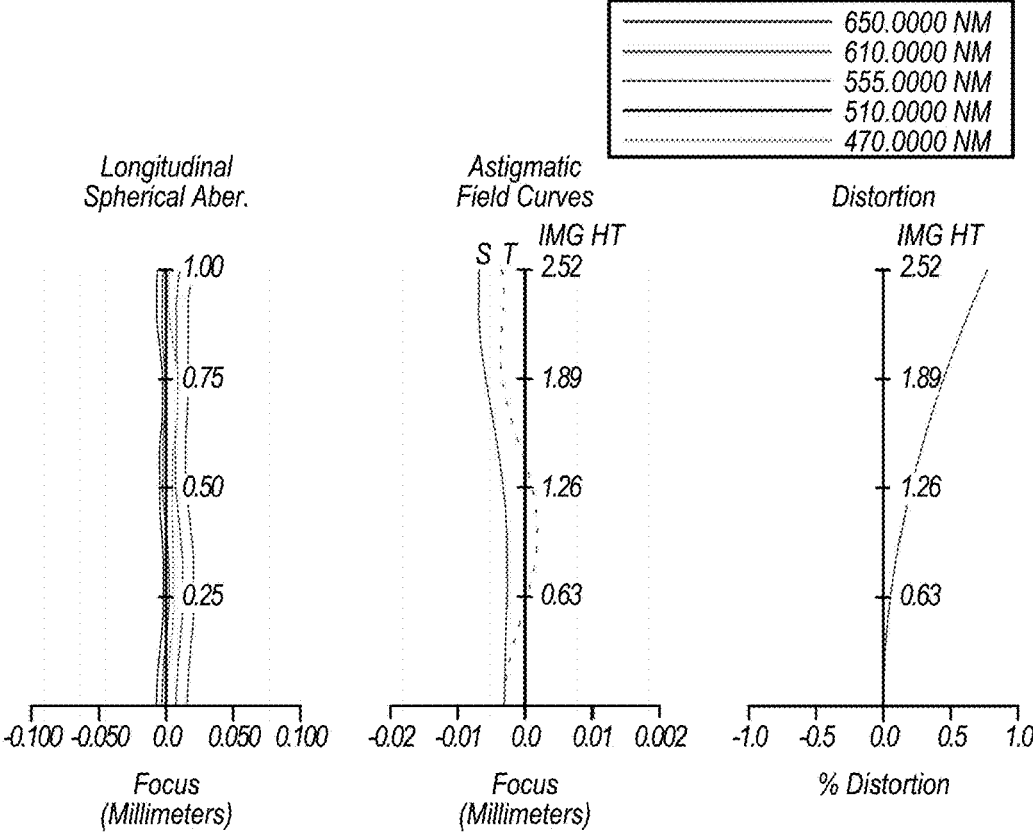

FIG. 12B shows longitudinal spherical aberration, astigmatic field curves, and distortion for a lens system as illustrated in FIG. 11 at infinity conjugate.

Figure 13A:
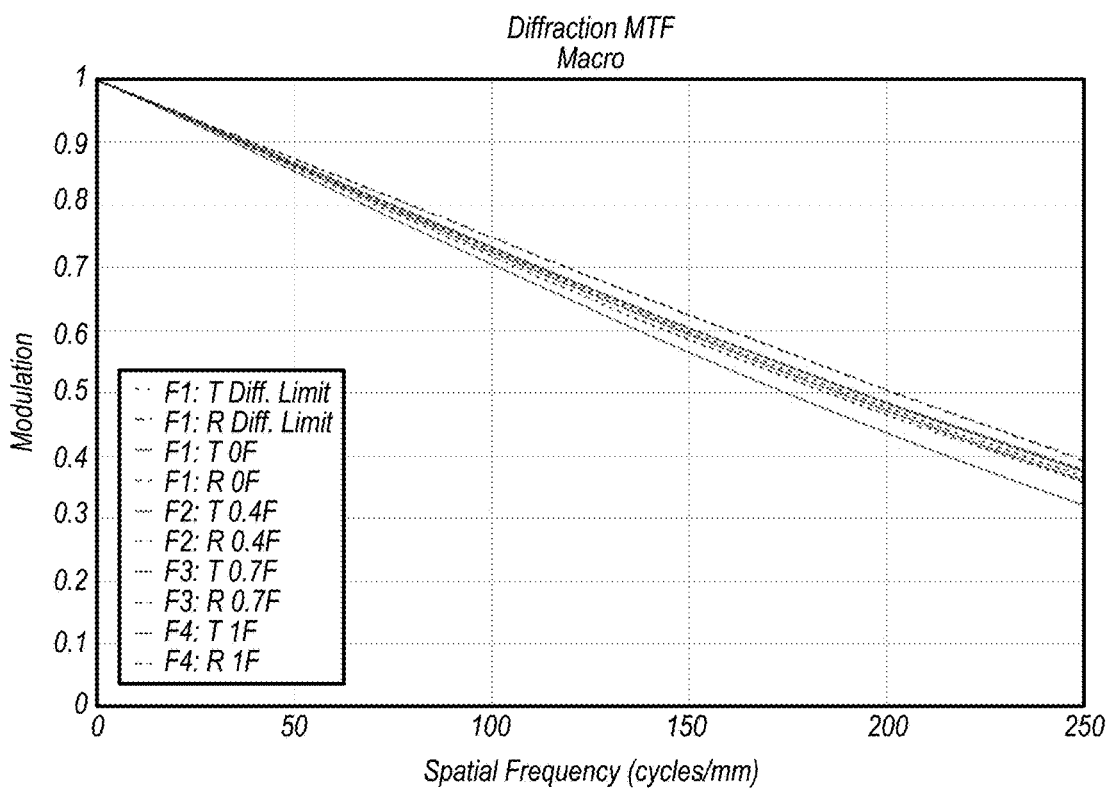

FIG. 13A is a graph illustrating a modulation transfer function (MTF) for a lens system as illustrated in FIG. 11 at macro conjugate.

Figure 13B:
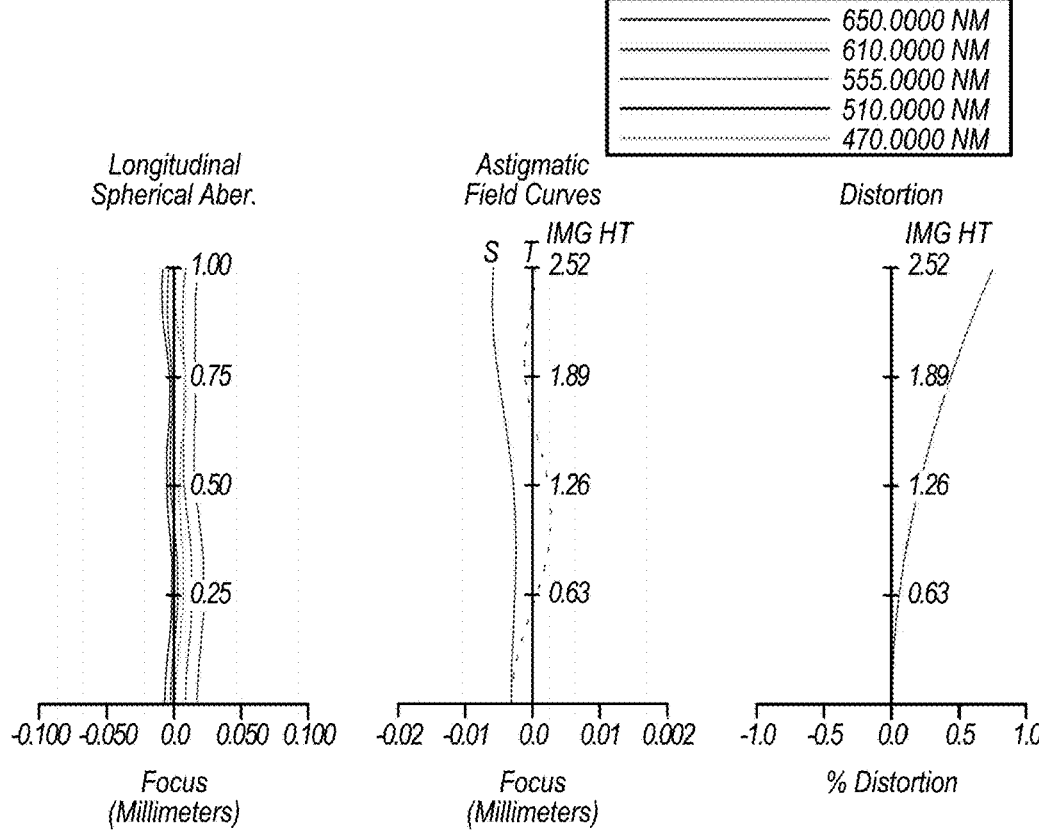

FIG. 13B shows longitudinal spherical aberration, astigmatic field curves, and distortion for a lens system as illustrated in FIG. 11 at macro conjugate.

Figure 14:
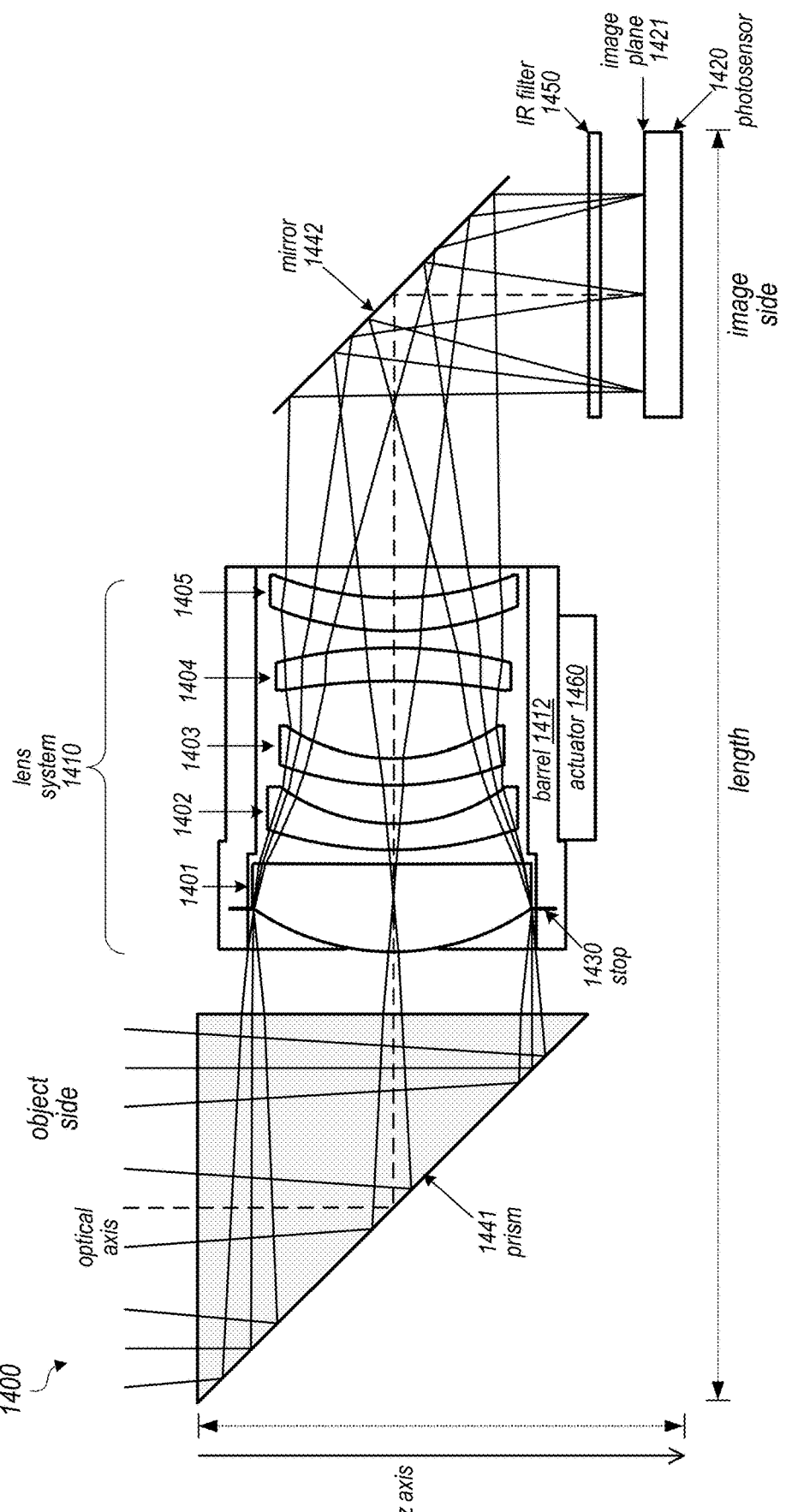

FIG. 14 is a cross-sectional illustration of a fourth example of a folded camera having five refractive lens elements in the lens system and a mirror as the second light folding element, according to some embodiments.

Figure 15:
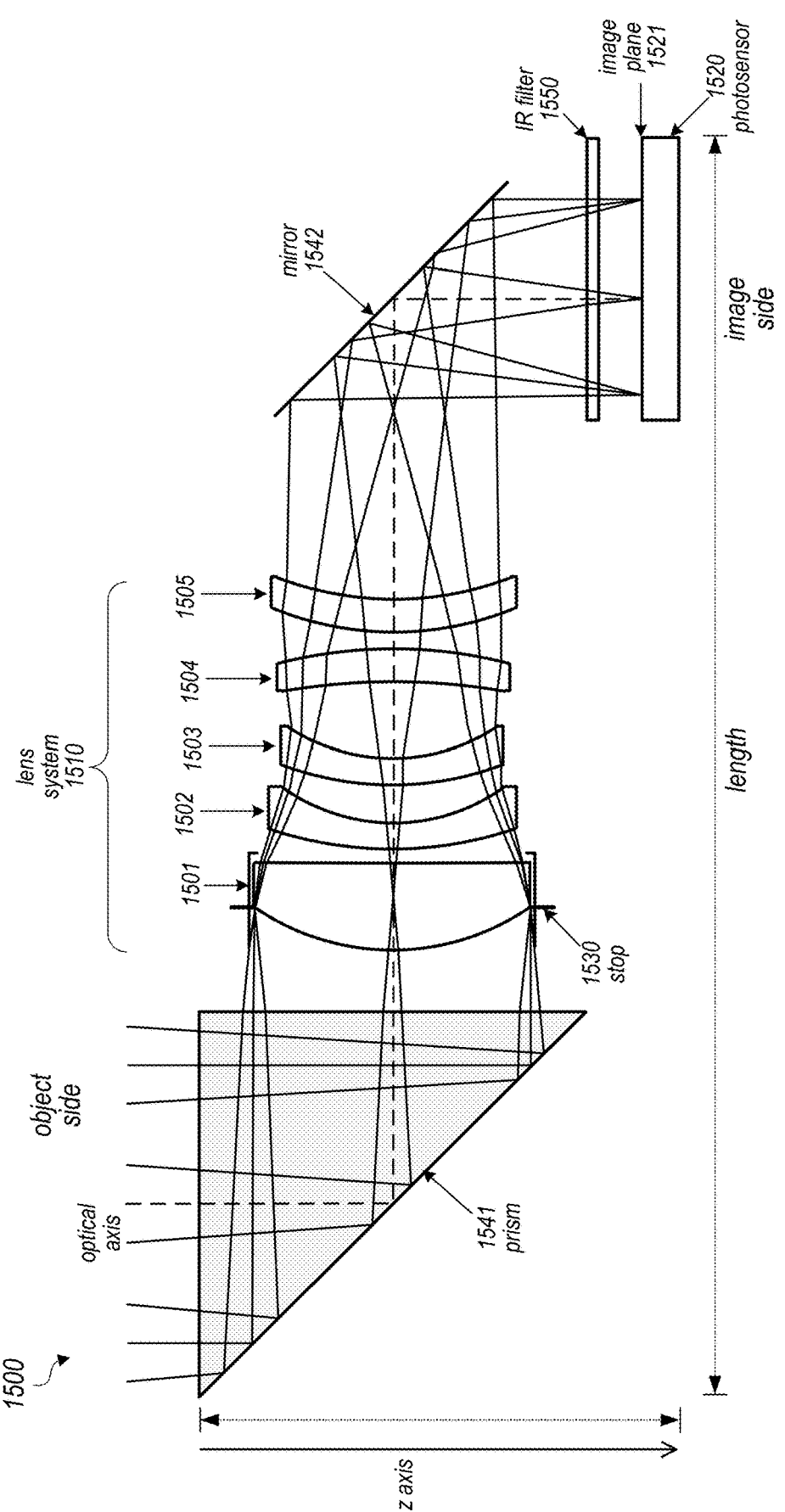

FIG. 15 is a diagram illustrating a fourth example of a lens system that includes five refractive lens elements to be positioned between a first light folding element (a prism) and a second light folding element (a mirror), according to some embodiments.

Figures 16A, 16B:
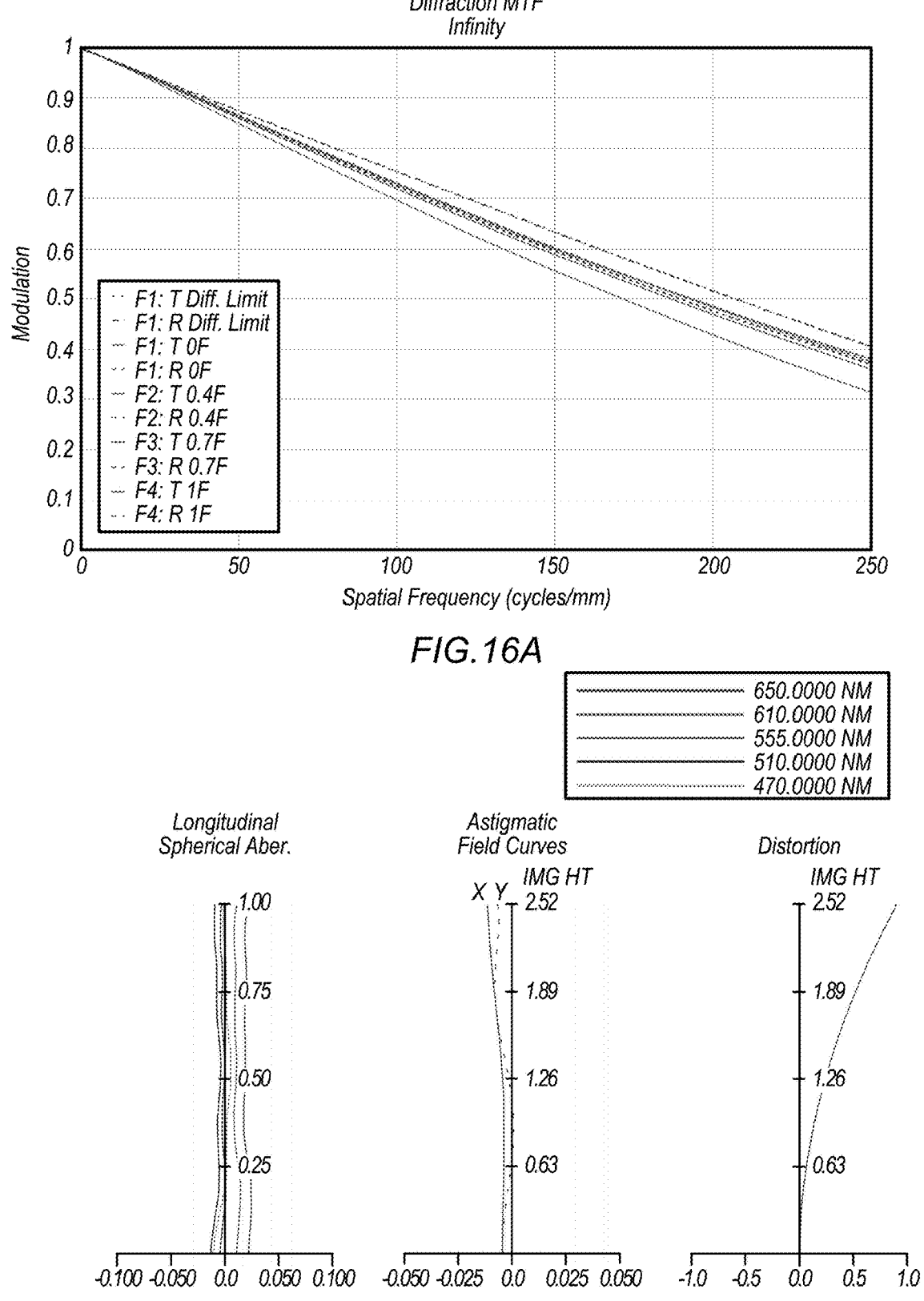

FIG. 16A is a graph illustrating a modulation transfer function (MTF) for a lens system as illustrated in FIG. 15 at infinity conjugate.

FIG. 16B shows longitudinal spherical aberration, astigmatic field curves, and distortion for a lens system as illustrated in FIG. 15 at infinity conjugate.

Figures 17A, 17B:
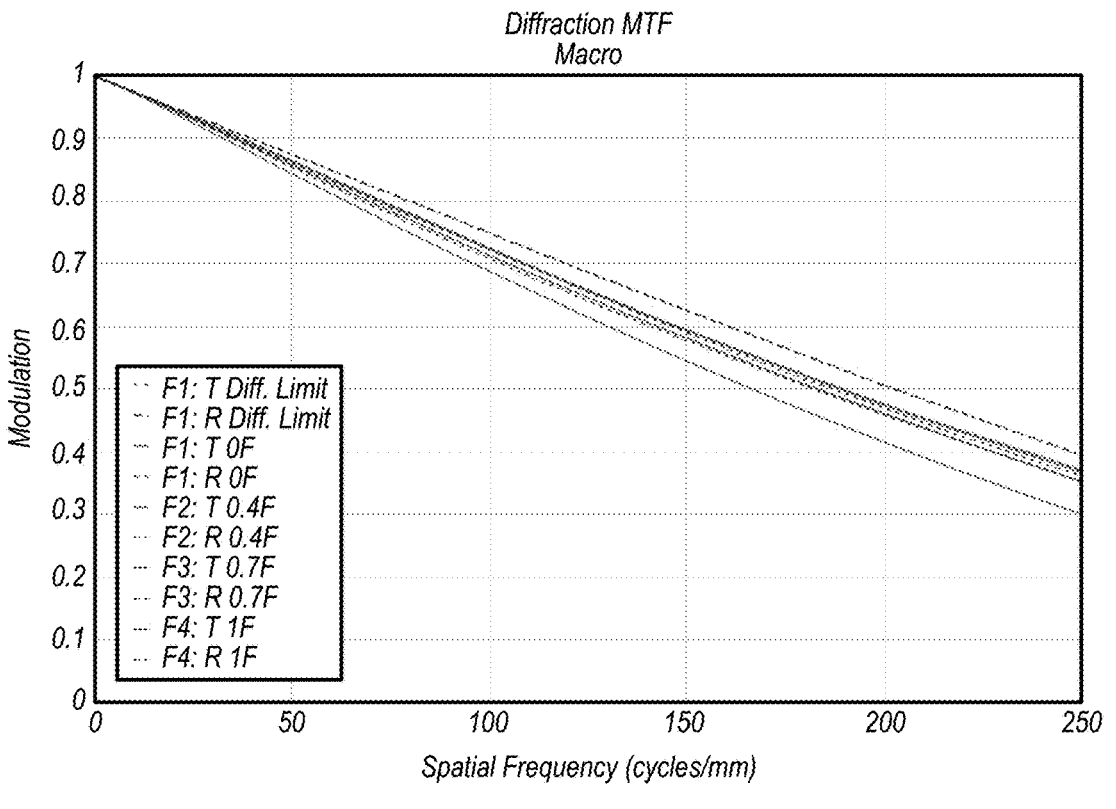

FIG. 17A is a graph illustrating a modulation transfer function (MTF) for a lens system as illustrated in FIG. 15 at macro conjugate.

FIG. 17B shows longitudinal spherical aberration, astigmatic field curves, and distortion for a lens system as illustrated in FIG. 15 at macro conjugate.

FIG. 18 is a flowchart of a method for capturing images using embodiments of a camera as illustrated in FIGS. 1A through 15, according to some embodiments.

Figure 19A:
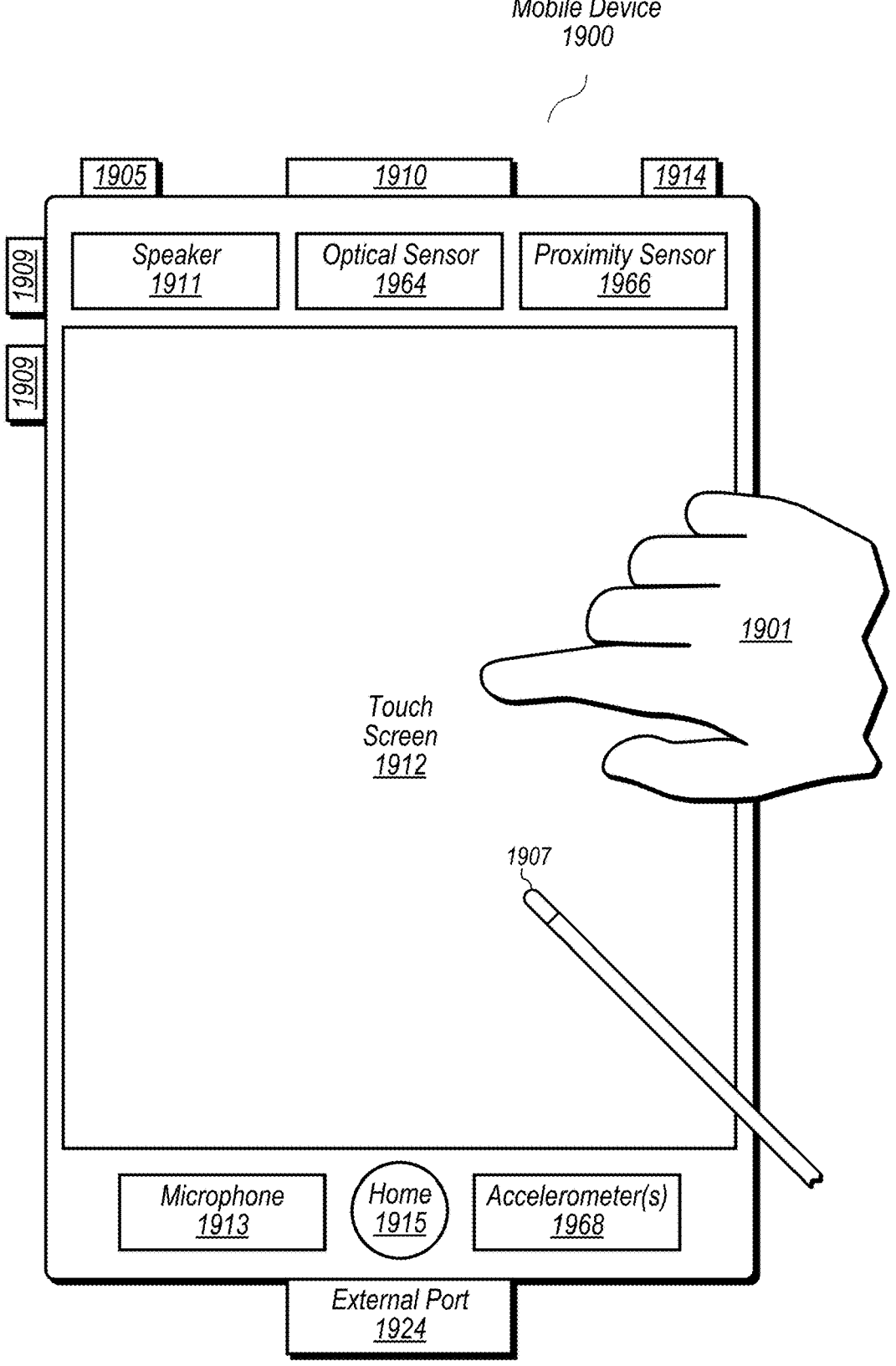
Figure 19B:
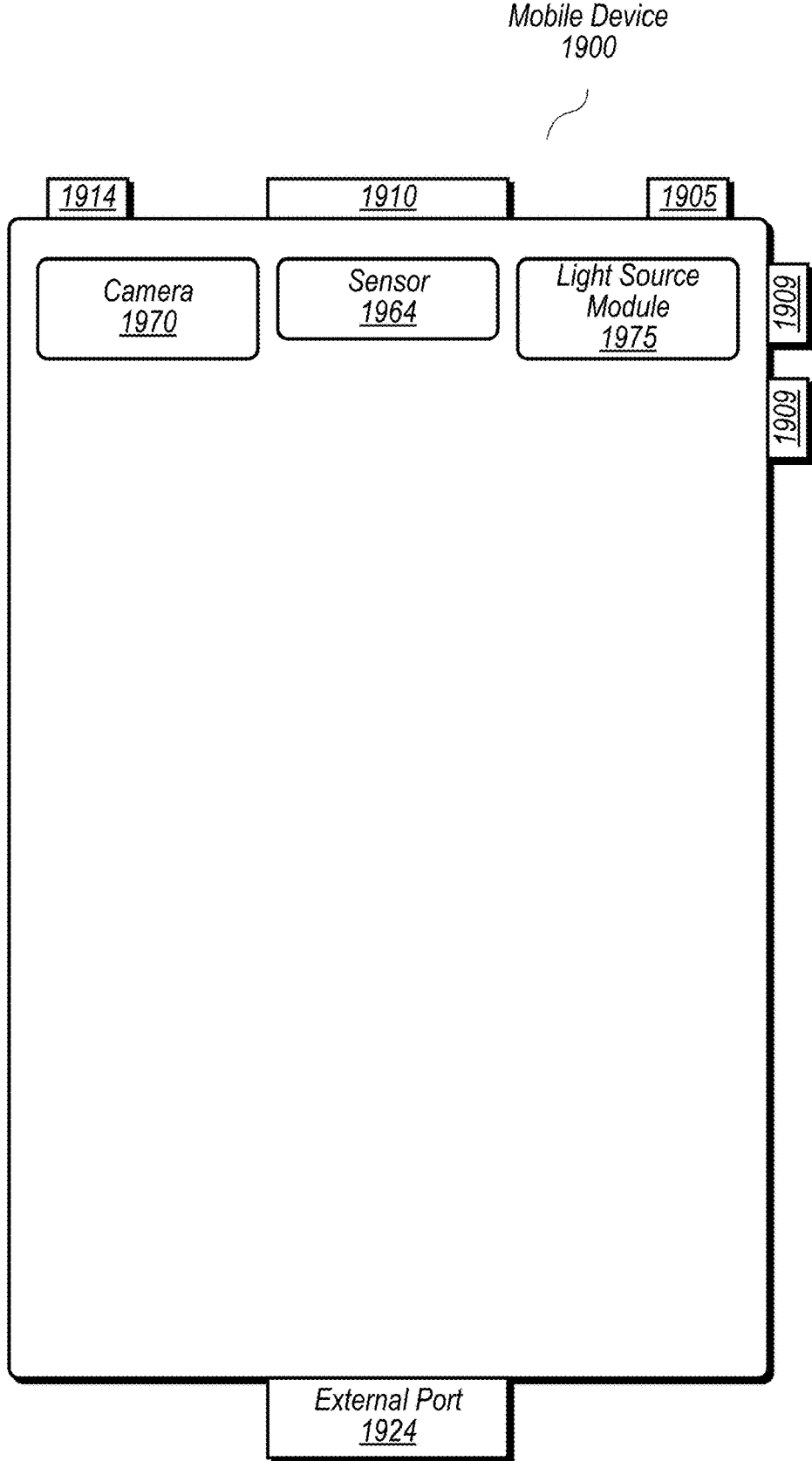
Figure 19C:
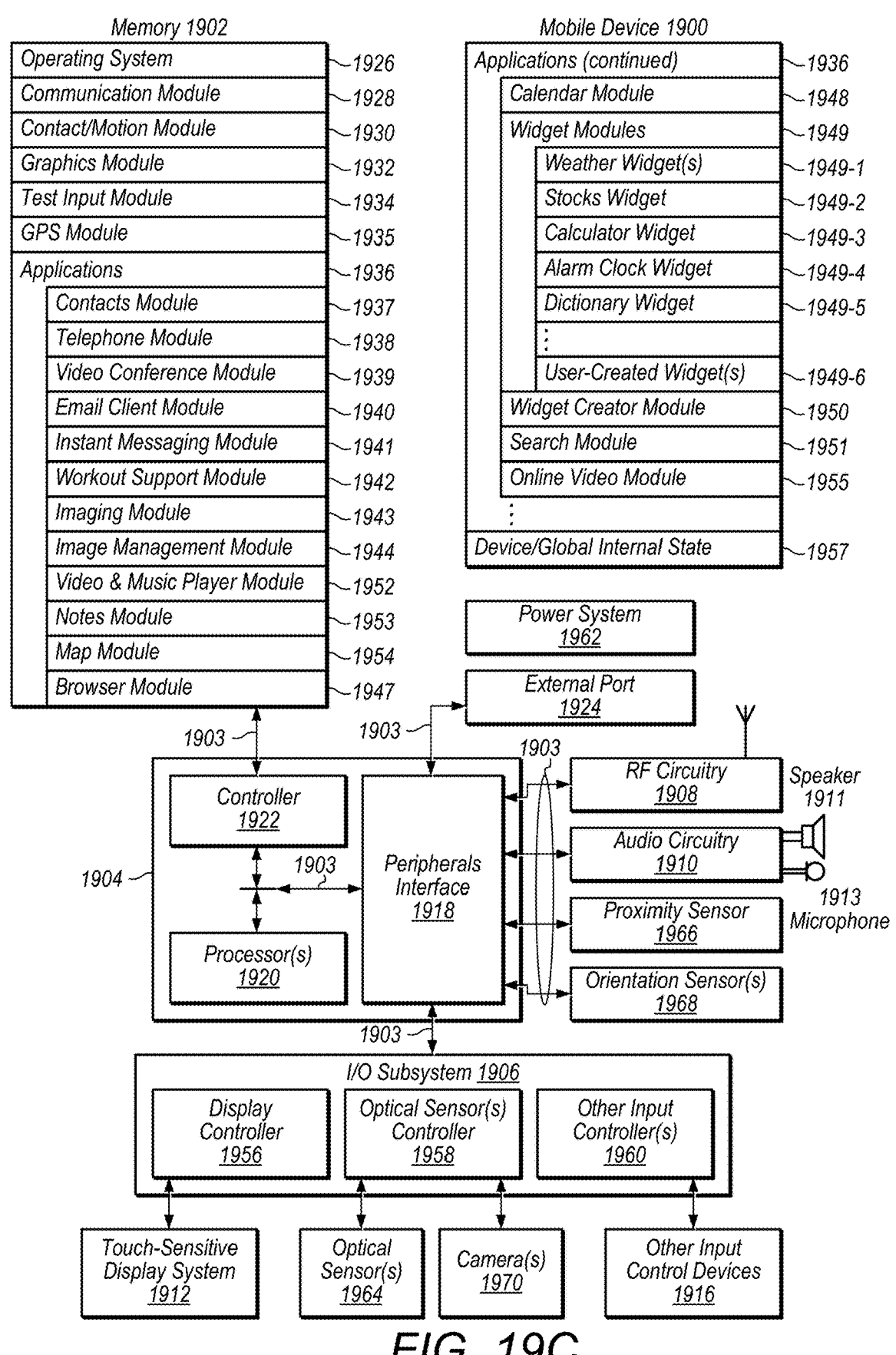

FIGS. 19A-19C illustrate a mobile device with a camera module having a folded camera with two light folding elements and an independent lens system, according to some embodiments.

Figure 20:
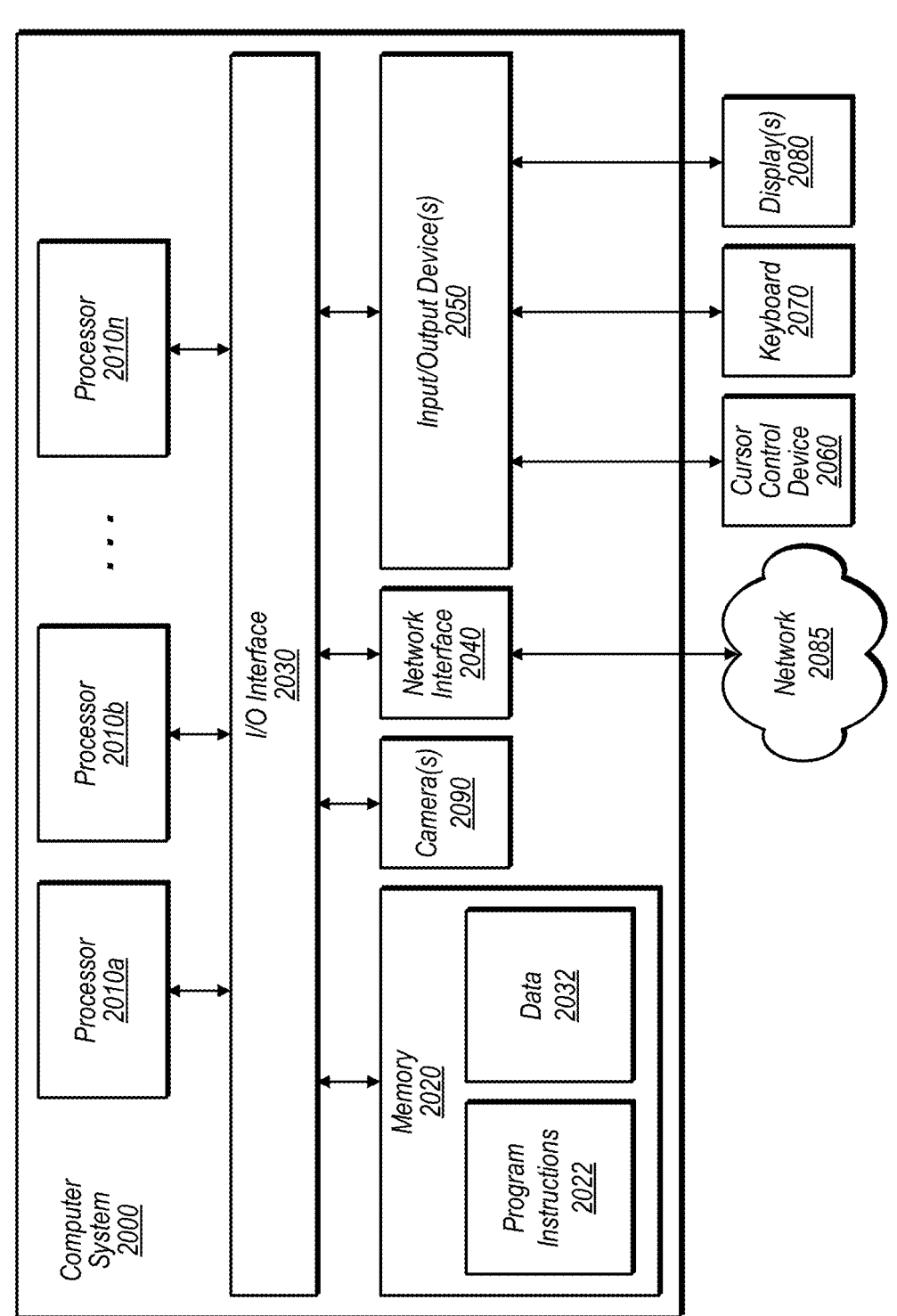

FIG. 20 illustrates an example computer system that may be used in embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors.

Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
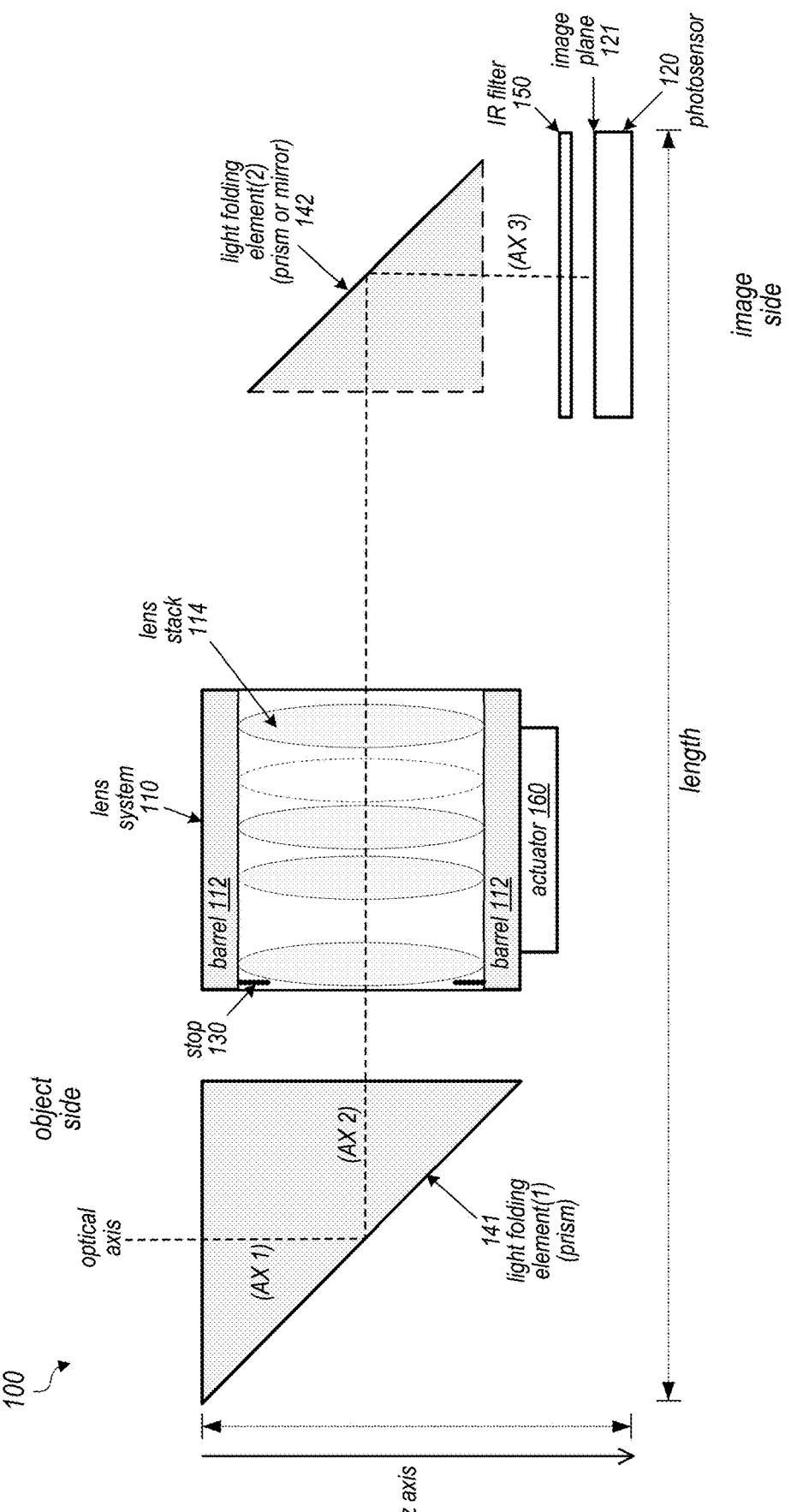
FIG. 1A illustrates components of a folded camera with two light folding elements and an independent lens system, according to some embodiments.

Embodiments of a folded camera are described that include two light folding elements (e.g., two prisms or one prism and a mirror) and a lens system located between the two light folding elements. The folded camera may be a telephoto camera. The lens system may be independent from the light folding elements. The lens system includes an aperture stop and lens elements with refractive power mounted in a barrel. The light folding elements and lens system may collectively be referred to as an optical system. FIG. 1A illustrates components of a folded camera 100 with a first light folding element 141 (a prism) and a second light folding element 142 (e.g., another prism or a mirror), and an independent lens system 110, according to some embodiments. The light folding elements 141 and 142 provide a "folded" optical axis for the camera 100, for example to reduce the Z-height (a height as measured from an uppermost surface of one or both of light folding elements 141, 142 and/or lens stack 114 to the image plane 121) to less than 9 mm. The lens system 110 includes a lens stack 114 including multiple refractive lens elements mounted in a lens barrel 112, and an aperture stop 130 located at or in front of a first lens element in the stack 114 in the embodiment illustrated (or between the first and second lens elements, in alternative embodiments). The first light folding element 141 is a prism that redirects light from an object field from a first axis (AX 1) to the lens system 110 on a second axis (AX 2). The lens elements in the lens stack 114 receive the light through the aperture stop 130 and refract the light to a second light folding element 142, which can be another prism or a mirror that redirects the light onto a third axis (AX 3) on which a photosensor 120 of the camera 100 is disposed. The redirected light forms an image at an image plane 121 at or near the surface of the photosensor 120. In some embodiments, the photosensor 120 may correspond to a 1 μm 12 megapixel (12 M) sensor or a 1 μm 8 megapixel (8 M) sensor.

The shapes, materials, and arrangements of the refractive lens elements in the lens stack 114 may be selected to capture high resolution, high quality images. The camera 100 may, but does not necessarily, include an infrared (IR) filter 150, for example located between the second light folding element 142 and the photosensor 120 as depicted in the example of FIG. 1A.

Figure 1B:
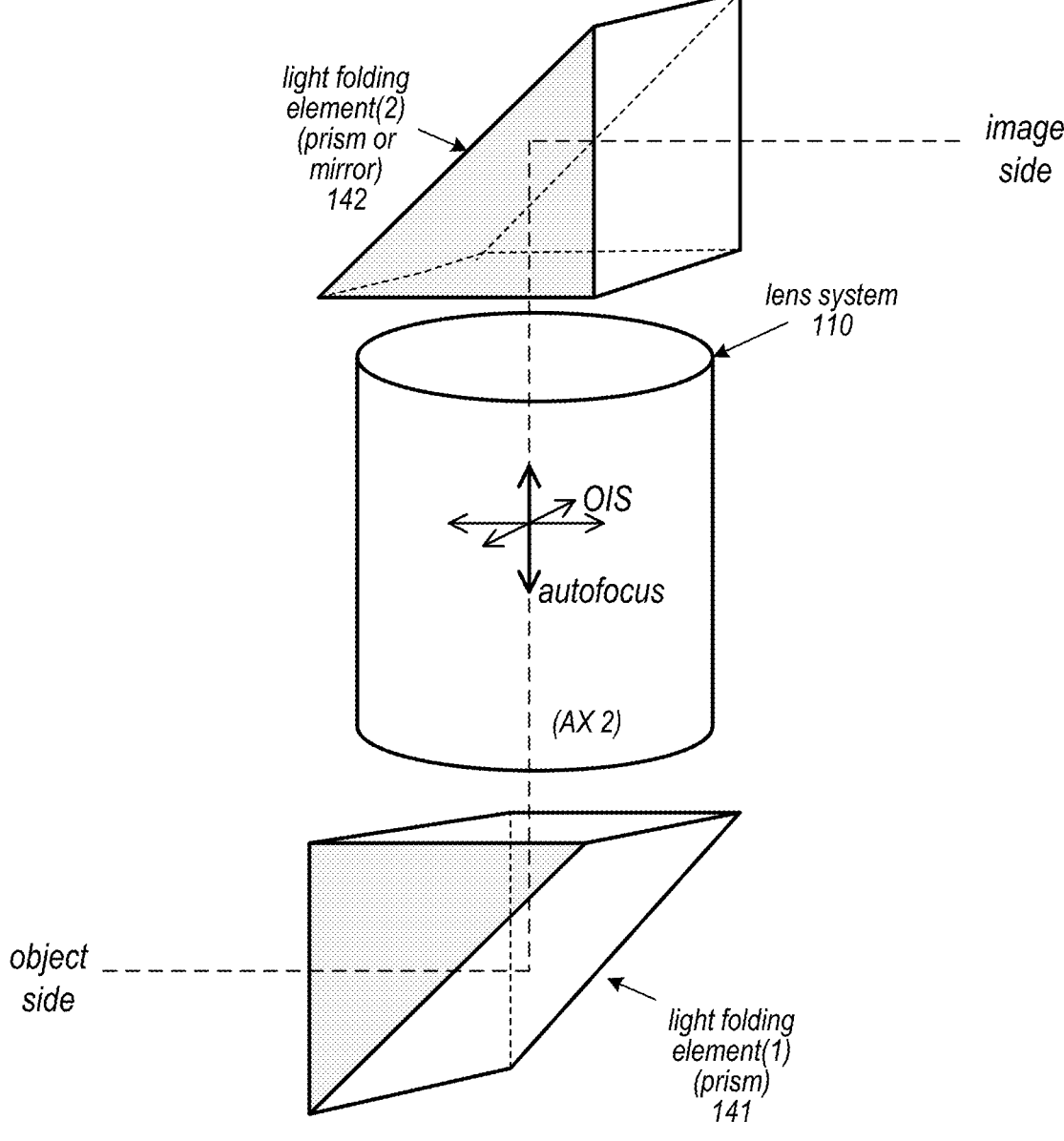
FIG. 1B illustrates movements of the lens system relative to the light folding elements in a camera as illustrated in FIG. 1A, according to some embodiments.

FIG. 1B illustrates movements of the lens system 110 independently of and relative to the light folding elements 141 and 142 in a camera 100 as illustrated in FIG. 1A, according to some embodiments. While FIG. 1B illustrates an embodiment in which the second light folding element 142 is a prism, the second light folding element 142 may be a mirror in alternative embodiments. In some embodiments, the camera 100 may include an actuator 160 component or components (see FIG. 1A) configured to move the lens system 110 on (parallel to) the second axis (AX 2) relative to and independently of the light folding elements 141 and 142 to provide autofocus functionality for the camera 100. In some embodiments, the actuator 160 component(s) may instead or also be configured to move the lens system 110 on one or more axes orthogonal to the second axis (AX 2) relative to and independently of the light folding elements 141 and 142 to provide optical image stabilization (OIS) functionality for the camera 100. While not shown, in some embodiments, one or both of the light folding elements 141 and 142 may be translated with respect to the second axis (AX 2) independently of the lens system 110 and/or tilted with respect to the second axis (AX 2) independently of the lens system 110, for example to provide OIS functionality for the camera 100 or to shift the image formed at an image plane 121 at the photosensor 120.

Embodiments of a "long-tele" (e.g., 5× zoom) design for a lens system for a folded camera as described herein "naturally" have a long back focal length (the distance from the last refractive lens element to the image plane) that is sufficient to provide space for either a second prism or a mirror to be used as a second light folding element. In addition, arrangements of power distribution, lens shapes, prism form factors, and lens materials may be selected to ensure that embodiments of the lens system provide low F-number (e.g., <=3.5, or in a range of 2.8 to 3.5), 4-6× optical zoom, a field-of-view (FOV) in a range of 14° to 24° (or in a range of 15° to 24°), and high resolution imaging. Further, compared to a 3×-3.5× "mid-zoom tele" design, the "long-zoom tele" design of the present disclosure (4-6× optical zoom) has a larger gap between lens and mirror/prism. Accordingly, in some embodiments, a five-part (5P) lens design having 5 lens elements may be implemented to shorten the optical total track length (TTL) (and thus shorten physical system length), as well as being configured for high image quality. The optical TTL is a distance from the vertex of the surface of the first lens element to the center of the 45° surface of the second prism (or mirror), and then extending down to the image plane. In some embodiments, a length from a front edge of the first folding element 141 to a back edge of the second folding element 142 may be less than 40 mm.

Embodiments of the folded camera as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIGS. 19A-C and 20 illustrate example devices that may include one or more small form factor cameras that use embodiments of the camera as described herein. However, note that aspects of the camera (e.g., the lens system, prisms, and photosensor) may be scaled up or down to provide cameras with larger or smaller package sizes. In addition, embodiments of the camera may be implemented as stand-alone digital cameras. In addition to still (single frame capture) camera applications, embodiments of the camera may be adapted for use in video camera applications.

Figure 2:
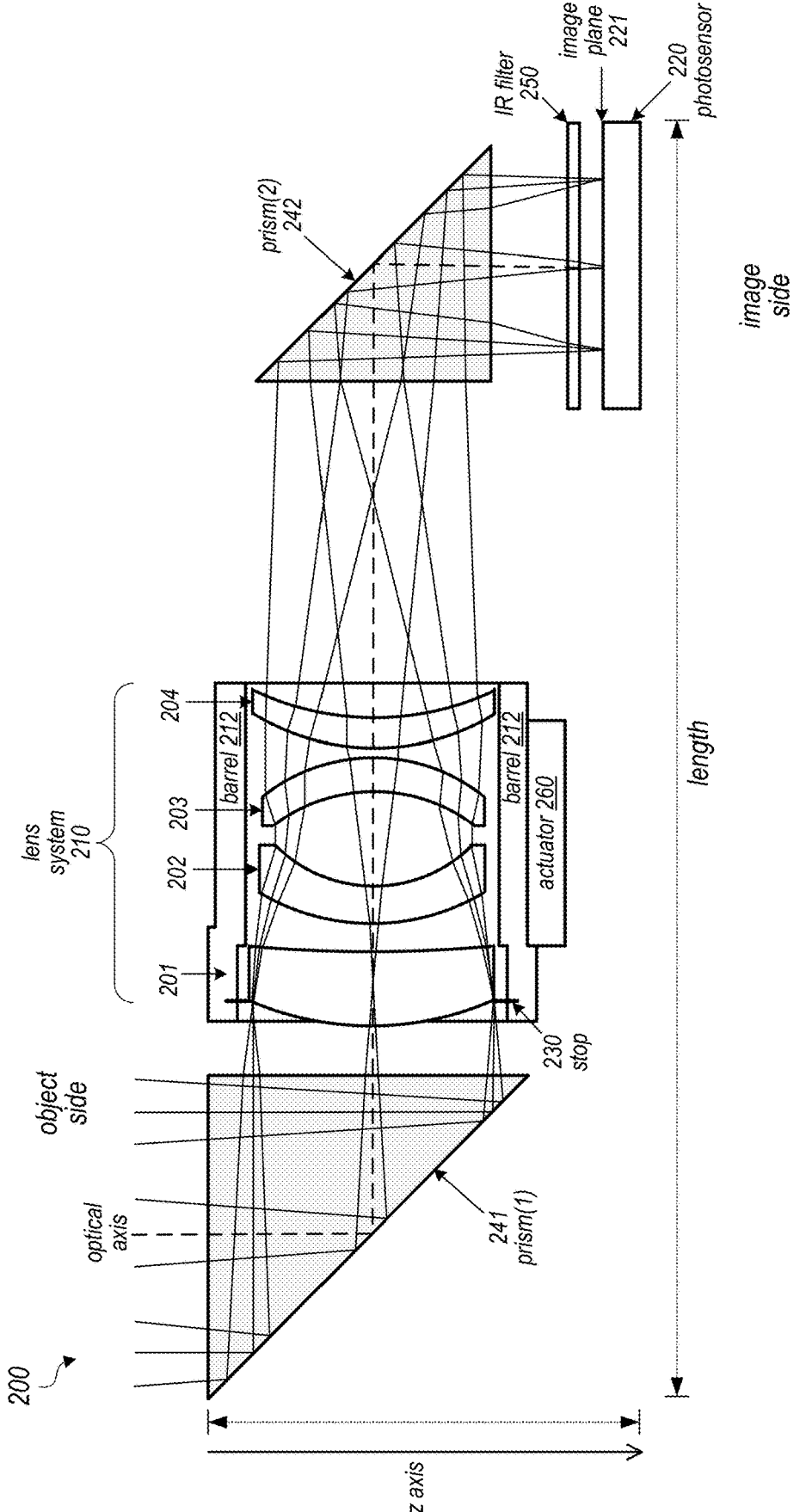
FIG. 2 is a cross-sectional illustration of a first example of a folded camera having four refractive lens elements in the lens system and a prism as the second light folding element, according to some embodiments.

FIG. 2 is a cross-sectional illustration of a first example of a folded camera having four refractive lens elements in the lens system and a prism as the second light folding element, according to some embodiments. FIG. 2 shows an example camera 200 including two prisms 241 and 242 that "fold" the optical axis of the camera 200 and an example embodiment of a lens system 210 with four refractive lens elements 201-204 located between the prisms 241 and 242. Both of the prisms 241 and 242 have refractive indexes satisfying Nd>1.5. The lens elements 201-204 are mounted in a lens barrel 212, with an aperture stop 230 located at or in front of the first (object side) lens element 201 in the embodiment depicted in FIG. 2 (or between the first and second lens elements 201, 202 in alternative embodiments). The first prism 241 folds the optical axis from a first axis (AX 1) that is parallel to the incoming light direction to a second axis (AX 2) that is orthogonal to the incoming light direction. The second prism 242 folds the optical axis from the second axis (AX 2) that is orthogonal to the incoming light direction to a third axis (AX 3) that is parallel to the incoming light direction.

The camera 200 also includes a photosensor 220, and may also include an optional infrared (IR) filter 250. A camera 200 including an embodiment of the lens system 210 as illustrated in FIG. 2 may, for example, be implemented in portable electronic devices such as mobile phones and tablets. Embodiments of the lens system 210 may provide a low F-number (<=3.5, such as in a range of 2.8 to 3.5), 4~6× optical zoom, and high resolution imaging.

In some embodiments, the camera 200 may include an actuator 260 component or components configured to move the lens system 210 on (parallel to) the second axis (AX 2) relative to and independently of the prisms 241 and 242 to provide autofocus functionality for the camera 200. In some embodiments, the actuator 260 component(s) may instead or also be configured to move the lens system 210 on one or more axes orthogonal to the second axis (AX 2) relative to and independently of the prisms 241 and 242 to provide optical image stabilization (OIS) functionality for the camera 200. Various types of mechanical, magnetic, or other actuator technology may be used in various embodiments. In some embodiments, one or both of the prisms 241 and 242 may be translated with respect to the second axis (AX 2) independently of the lens system 210 and/or tilted with respect to the second axis (AX 2) independently of the lens system 210, for example to provide OIS functionality for the camera 210 or to shift the image formed at an image plane 221 at the photosensor 220.

As shown in the example of FIG. 2, embodiments of the lens system 210 may include four lens elements 201-204 with refractive power. Note, however, that some embodiments may include more or fewer refractive lens elements. Some embodiments, the combination of the two light folding elements and the lens system 210 may provide a 35 mm equivalent focal length in the range of 85-160 mm (or in a range of 90-160 mm), and less than 9 mm of Z-height to fit in a wide variety of portable electronics devices. With proper arrangement of materials and lens powers, embodiments of the lens system 210 are capable of capturing high brightness photographs or video frames with near diffraction-limited image quality. In a particular embodiment for a 5× zoom design, the lens system 210 may provide a 35 mm equivalent focal length of approximately 130 mm and an F-value that is less than 3.5. In this example embodiment, the sensor 220 may be a 12 megapixel (12 M) sensor.

As illustrated in the example camera 200 of FIG. 2, the lens system 210 may include four lens elements 201-204 with refractive power, in order from the object side to the image side of the camera 200. A first lens element 201 has positive refractive power for converging light and an aspheric shape to correct spherical aberration, with an Abbe number vd that is greater than 50. A second lens element 202 has negative refractive power and a meniscus shape to correct field curvature, having an Abbe number vd that is less than 30. A third lens element 203 has a meniscus shape and has a concave object-side surface in a paraxial region and a convex image-side surface in the paraxial region. A focal length (f3) of the third lens element 203 and a focal length (f) of the optical system satisfies the relationship of $|f/f3|<0.4$. A fourth lens element 204 has a meniscus shape. At least one of the refractive lens elements may be formed of lightweight polymer or plastic material. An aperture stop

230 may be located in the lens system 210 at the first lens element 201 (or between the first and second lens elements 201, 202 in alternative embodiments) for controlling the brightness of the camera 200. Note that the power order, shape, or other optical characteristics of the refractive lens elements may be different in some embodiments, and some embodiments may include more or fewer refractive lens elements. The four refractive lens elements 201-204 stack to secure the required long-telephoto lens FOV, enabling the optical zoom when pairing with a wide-angle lens, while being configured properly in lens materials and power configurations for correcting aberrations.

In some embodiments, the camera 200 includes two right-angle prisms 241 and 242 to change the direction of the light passing through the camera 200. In some embodiments, one or both of the prisms may be shifted or tilted relative to the position of the lens system 210 to provide autofocus and/or OIS functionality for the camera 200. In some embodiments, the aperture stop 230 is integrated in the lens system 210 to control brightness in the camera 200. Integrating the stop 230 in the lens system 210 enables the lens system 210 to be isolated from and moved independently with relation to the prisms 241 and 242. In some embodiments, the aperture stop 230 may be fixed; the diameter of the stop 230 may be chosen according to system requirements. However, in some embodiments, the aperture stop may be adjustable.

In some embodiments, the camera 200 includes an IR filter 250, for example located between the second prism 242 and photosensor 220 as depicted in FIG. 2, to reduce or eliminate interference of environmental noises on the sensor 220.

Camera 200 Z-height is sensitive to barrel 212 diameter. In some embodiments, to provide a desired Z-height for a particular camera 200 application, the structure of the barrel 212 may be modified. For example, in various embodiments of a camera 200, the barrel 212 may be truncated, may be tapered, may be single-sided, and/or may have a reverse assembly structure.

FIG. 3 is a diagram illustrating a first example of a lens system that includes four refractive lens elements to be positioned between a first light folding element (a first prism) and a second light folding element (a second prism), according to some embodiments. A camera 300 may include a photosensor 320, two light folding elements (e.g., prisms 341 and 342), and an independent lens system 310 located between the two prisms 341 and 342 that includes an aperture stop 330 and lens elements with refractive power to be mounted in a lens barrel (not shown in FIG. 3, see FIG. 2). The two prisms 341 and 342 provide a "folded" optical axis for the camera 300, for example to reduce the Z-height of the camera 300. The lens system 310 includes an aperture stop 330 to control system brightness while maintaining an integrated lens system that is independent of the two prisms 341 and 342. The camera 300 may, but does not necessarily, include an infrared (IR) filter 350, for example located between the second prism 342 and the photosensor 320 as depicted in FIG. 3.

The example lens system 310 shown in FIG. 3 includes a lens stack having four refractive elements 301-304 that provide a low F-number (<=F/3.5, such as in a range of 2.8 to 3.5), 4~6× optical zoom, and high resolution imaging. Lens element 301 has positive refractive power for converging light and an aspheric shape to correct spherical aberration, having an Abbe number that is greater than 50. Lens element 302 has negative refractive power and a meniscus shape to correct field curvature, having an Abbe number that is less than 30. Lens element 303 has a meniscus shape and has a concave object-side surface in a paraxial region and a convex image-side surface in the paraxial region. Lens element 304 has a meniscus shape.

In some embodiments, the lens system 310 may be shifted along AX 2 independently of the two prisms 341 and 342 to allow refocusing of the lens system 310 between Infinity conjugate and Macro (e.g., one meter) conjugate. In some embodiments, the lens system 310 may be shifted on one or more axes orthogonal to AX 2 to provide OIS functionality for the camera 300. In various embodiments, lens elements 301, 302, 303, and/or 304 may be round/circular or rectangular, or some other shape. Note that in various embodiments, a lens system 310 may include more or fewer refractive lens elements, and the lens elements may be configured or arranged differently.

In some embodiments, one or both of the prisms 341 and 342 may be shifted independently of the lens system 310 along one or more axes by a mechanical actuator mechanism to facilitate autofocus functionality for the lens system 310 between Infinity conjugate and Macro (e.g., one meter) conjugate. In some embodiments, one or both of the prisms 341 and 342 may be translated with respect to the second axis (AX 2) independently of the lens system 310 and/or tilted with respect to the second axis (AX 2) independently of the lens system 310 by a mechanical actuator mechanism, for example to provide OIS functionality for the camera 300 or to shift the image formed at an image plane 321 at the photosensor 320.

FIG. 4A is a graph illustrating a modulation transfer function (MTF) for a lens system 310 as illustrated in FIG. 3 at infinity conjugate. FIG. 4B shows longitudinal spherical aberration, astigmatic field curves, and distortion for a lens system 310 as illustrated in FIG. 3 at infinity conjugate.

FIG. 5A is a graph illustrating a modulation transfer function (MTF) for a lens system 310 as illustrated in FIG. 3 at macro (e.g., one meter) conjugate. FIG. 5B shows longitudinal spherical aberration, astigmatic field curves, and distortion for a lens system 310 as illustrated in FIG. 3 at macro (e.g., one meter) conjugate.

FIG. 6 is a cross-sectional illustration of a second example of a folded camera having four refractive lens elements in the lens system, according to some embodiments. FIG. 6 shows an example camera 600 including a prism 641 and a mirror 642 that "fold" the optical axis of the camera 600 and an example embodiment of a lens system 610 with four refractive lens elements 601-604 located between the prism 641 and the mirror 642. The prism 641 has a refractive index satisfying Nd>1.5. The lens elements 601-604 are mounted in a lens barrel 612, with an aperture stop 630 located at or in front of the first (object side) lens element 601 (or between the first and second lens elements 601,602 in alternative embodiments). The prism 641 folds the optical axis from a first axis (AX 1) that is parallel to the incoming light direction to a second axis (AX 2) that is orthogonal to the incoming light direction. The mirror 642 folds the optical axis from the second axis (AX 2) that is orthogonal to the incoming light direction to a third axis (AX 3) that is parallel to the incoming light direction.

The camera 600 also includes a photosensor 620, and may also include an optional infrared (IR) filter 650. A camera 600 including an embodiment of the lens system 610 as illustrated in FIG. 6 may, for example, be implemented in portable electronic devices such as mobile phones and tablets. Embodiments of the lens system 610 may provide a low F-number (<=3.5, such as in a range of 2.8 to 3.5), 4~6× optical zoom, and high resolution imaging.

In some embodiments, the camera 600 may include an actuator 660 component or components configured to move the lens system 610 on (parallel to) the second axis (AX 2) relative to and independently of the prism 641 and the mirror 642 to provide autofocus functionality for the camera 600. In some embodiments, the actuator 660 component(s) may instead or also be configured to move the lens system 610 on one or more axes orthogonal to the second axis (AX 2) relative to and independently of the prism 641 and the mirror 642 to provide optical image stabilization (OIS) functionality for the camera 600. Various types of mechanical, magnetic, or other actuator technology may be used in various embodiments. In some embodiments, one or both of the prism 641 and the mirror 642 may be translated with respect to the second axis (AX 2) independently of the lens system 610 and/or tilted with respect to the second axis (AX 2) independently of the lens system 610, for example to provide OIS functionality for the camera 600 or to shift the image formed at an image plane 621 at the photosensor 620.

As shown in the example of FIG. 6, embodiments of the lens system 610 may include four lens elements 601-604 with refractive power. Note, however, that some embodiments may include more or fewer refractive lens elements. In some embodiments, the combination of the two light folding elements and the lens system 610 may provide a 35 mm equivalent focal length in the range of 85-160 mm (or in a range of 90-160 mm) and less than 9 mm of Z-height to fit in a wide variety of portable electronics devices. With proper arrangement of materials and lens powers, embodiments of the lens system 610 are capable of capturing high brightness photographs or video frames with near diffraction-limited image quality. In a particular embodiment for a 6× zoom design, the lens system 610 may provide a 35 mm equivalent focal length of approximately 156 mm and an F-value that is less than 3.5. In this example embodiment, the sensor 620 may be an 8 megapixel (8 M) sensor.

As illustrated in the example camera 600 of FIG. 6, the lens system 610 may include four lens elements 601-604 with refractive power, in order from the object side to the image side of the camera 600. A first lens element 601 has positive refractive power for converging light and an aspheric shape to correct spherical aberration, with an Abbe number vd that is greater than 50. A second lens element 602 has negative refractive power and a meniscus shape to correct field curvature, with an Abbe number vd that is less than 30. A third lens element 603 has a meniscus shape and has a concave object-side surface in a paraxial region and a convex image-side surface in the paraxial region. A focal length (f3) of the third lens element 603 and a focal length (f) of the optical system satisfies the relationship of |f/f3|<0.8. A fourth lens element 604 has refractive power. At least one of the refractive lens elements may be formed of lightweight polymer or plastic material. An aperture stop 630 may be located in the lens system 610 at the first lens element 601 (or between the first and second lens elements 601, 602) for controlling the brightness of the camera 600. Note that the power order, shape, or other optical characteristics of the refractive lens elements may be different in some embodiments, and some embodiments may include more or fewer refractive lens elements. The four refractive lens elements 601-604 stack to secure the required long-telephoto lens FOV, enabling the optical zoom when pairing with a wide-angle lens, while being configured properly in lens materials and power configurations for correcting aberrations.

In some embodiments, the camera 600 includes a right-angle prism 641 and the mirror 642 positioned to change the direction of the light passing through the camera 600. In some embodiments, one or both of the prism 641 and/or mirror 642 may be shifted or tilted relative to the position of the lens system 610 to provide autofocus and/or OIS functionality for the camera 600. In some embodiments, the aperture stop 630 is integrated in the lens system 610 to control brightness in the camera 600. Integrating the stop 630 in the lens system 610 enables the lens system 610 to be isolated from and moved independently with relation to the prism 641 and the mirror 642. In some embodiments, the aperture stop 630 may be fixed; the diameter of the stop 630 may be chosen according to system requirements. However, in some embodiments, the aperture stop may be adjustable.

In some embodiments, the camera 600 includes an IR filter 650, for example located between the mirror 642 and photosensor 620 as depicted in FIG. 6, to reduce or eliminate interference of environmental noises on the sensor 620.

Camera 600 Z-height is sensitive to barrel 612 diameter. In some embodiments, to provide a desired Z-height for a particular camera 600 application, the structure of the barrel 612 may be modified. For example, in various embodiments of a camera 600, the barrel 612 may be truncated, may be tapered, may be single-sided, and/or may have a reverse assembly structure.

FIG. 7 is a diagram illustrating a second example of a lens system that includes four refractive lens elements to be positioned between a first light folding element (a prism) and a second light folding element (a mirror), according to some embodiments. A camera 700 may include a photosensor 720, two light folding elements (e.g., a prism 741 and a mirror 742), and an independent lens system 710 located between the prism 741 and the mirror 742 that includes an aperture stop 730 and lens elements with refractive power to be mounted in a lens barrel (not shown in FIG. 7, see e.g., FIG. 6). The prism 741 and the mirror 742 provide a "folded" optical axis for the camera 700, for example to reduce the Z-height of the camera 700. The lens system 710 includes an aperture stop 730 to control system brightness while maintaining an integrated lens system that is independent of the prism 741 and the mirror 742. The camera 700 may, but does not necessarily, include an infrared (IR) filter 750, for example located between the mirror 742 and the photosensor 720.

The example lens system 710 shown in FIG. 7 includes a lens stack having four refractive elements 701-704 that provide a low F-number (<=F/3.5, such as in a range of 2.8 to 3.5), 4~6× optical zoom, and high resolution imaging. A first lens element 701 has positive refractive power for converging light and an aspheric shape to correct spherical aberration, having an Abbe number that is greater than 50. A second lens element 702 has negative refractive power and a meniscus shape to correct field curvature, having an Abbe number that is less than 30. A third lens element 703 has a meniscus shape and has a concave object-side surface in a paraxial region and a convex image-side surface in the paraxial region. A fourth lens element 704 has refractive power.

In some embodiments, the lens system 710 may be shifted along AX 2 independently of the prism 741 and the mirror 742 to allow refocusing of the lens system 710 between Infinity conjugate and Macro (e.g., one meter) conjugate. In some embodiments, the lens system 710 may be shifted on one or more axes orthogonal to AX 2 to provide OIS functionality for the camera 700. In various embodiments, lens elements 701, 702, 703, and/or 704 may be round/circular or rectangular, or some other shape. Note that in various embodiments, a lens system 710 may include more or fewer refractive lens elements, and the lens elements may be configured or arranged differently.

In some embodiments, one or both of the prism 741 and/or the mirror 742 may be shifted independently of the lens system 710 along one or more axes by a mechanical actuator mechanism to facilitate autofocus functionality for the lens system 710. In some embodiments, one or both of the prism 741 and/or the mirror 742 may be translated with respect to the second axis (AX 2) independently of the lens system 710 and/or tilted with respect to the second axis (AX 2) independently of the lens system 742 by a mechanical actuator mechanism, for example to provide OIS functionality for the camera 710 or to shift the image formed at an image plane 721 at the photosensor 720.

FIG. 8A is a graph illustrating a modulation transfer function (MTF) for a lens system 710 as illustrated in FIG. 7 at infinity conjugate. FIG. 8B shows longitudinal spherical aberration, astigmatic field curves, and distortion for a lens system 710 as illustrated in FIG. 7 at infinity conjugate.

FIG. 9A is a graph illustrating a modulation transfer function (MTF) for a lens system 710 as illustrated in FIG. 7 at macro (e.g., one meter) conjugate. FIG. 9B shows longitudinal spherical aberration, astigmatic field curves, and distortion for a lens system 710 as illustrated in FIG. 7 at macro (e.g., one meter) conjugate.

FIG. 10 is a cross-sectional illustration of a third example of a folded camera having five refractive lens elements in the lens system, according to some embodiments. FIG. 10 shows an example camera 1000 including two prisms 1041 and 1042 that "fold" the optical axis of the camera 1000 and an example embodiment of a lens system 1010 with five refractive lens elements 1001-1005 located between the prisms 1041 and 1042. Both of the prisms 1041 and 1042 have refractive indexes satisfying Nd>1.5. The lens elements 1001-1005 are mounted in a lens barrel 1012, with an aperture stop 1030 located at or in front of the first (object side) lens element 1001 (or between the first and second lens elements 1001, 1002 in alternative embodiments). The first prism 1041 folds the optical axis from a first axis (AX 1) that is parallel to the incoming light direction to a second axis (AX 2) that is orthogonal to the incoming light direction. The second prism 1042 folds the optical axis from the second axis (AX 2) that is orthogonal to the incoming light direction to a third axis (AX 3) that is parallel to the incoming light direction.

The camera 1000 also includes a photosensor 1020, and may also include an optional infrared (IR) filter 1050. A camera 1000 including an embodiment of the lens system 1010 as illustrated in FIG. 10 may, for example, be implemented in portable electronic devices such as mobile phones and tablets. Embodiments of the lens system 1010 may provide a low F-number (<=3.5, such as in a range of 2.8 to 3.5), 4~6× optical zoom, and high resolution imaging. The five refractive lens elements 1001-1005 stack to secure the desired long-telephoto lens field of view (FOV), enabling the optical zoom when pairing with a wide-angle lens and configured properly in lens materials and power configurations for correcting aberrations. In addition, it is configured so that the optical TTL is reduced without sacrificing the ability to correct aberrations across the field of view.

In some embodiments, the camera 1000 may include an actuator 1060 component or components configured to move the lens system 1010 on (parallel to) the second axis (AX 2) relative to and independently of the prisms 1041 and 1042 to provide autofocus functionality for the camera 1000. In some embodiments, the actuator 1060 component(s) may instead or also be configured to move the lens system 1010 on one or more axes orthogonal to the second axis (AX 2) relative to and independently of the prisms 1041 and 1042 to provide optical image stabilization (OIS) functionality for the camera 1000. Various types of mechanical, magnetic, or other actuator technology may be used in various embodiments. In some embodiments, one or both of the prisms 1041 and 1042 may be translated with respect to the second axis (AX 2) independently of the lens system 1010 and/or tilted with respect to the second axis (AX 2) independently of the lens system 1010, for example to provide OIS functionality for the camera 1000 or to shift the image formed at an image plane 1021 at the photosensor 1020.

As shown in the example of FIG. 10, embodiments of the lens system 1010 may include five lens elements 1001-1005 with refractive power. Note, however, that some embodiments may include more or fewer refractive lens elements. In some embodiments, the combination of the two light folding elements and the lens system 1010 may provide a 35 mm equivalent focal length in the range of 85-160 mm (or in a range of 90-160 mm), and less than 9 mm of Z-height to fit in a wide variety of portable electronics devices. With proper arrangement of materials and lens powers, embodiments of the lens system 1010 are capable of capturing high brightness photographs or video frames with near diffraction-limited image quality. In a particular embodiment for a 5× zoom design, the lens system 1010 may provide a 35 mm equivalent focal length of approximately 130 mm and an F-value that is less than 3.5. In this example embodiment, the sensor 1020 may be a 12 megapixel (12 M) sensor.

As illustrated in the example camera 1000 of FIG. 10, the lens system 1010 may include five lens elements 1001-1005 with refractive power, in order from the object side to the image side of the camera 1000. A first lens element 1001 has positive refractive power for converging light and an aspheric shape to correct spherical aberration, with an Abbe number vd that is greater than 50. A second lens element 1002 has negative refractive power, with an Abbe number vd that is less than 30. A third lens element 1003 has a meniscus shape and has a convex object-side surface in a paraxial region and a concave image-side surface in the paraxial region. The third lens element 1003 is situated in the middle of the lens stack to balance the excessive negative power as introduced by the second lens element 1002 for field curvature and astigmatism control. A focal length (f3) of the third lens element 1003 and a focal length (f) of the optical system satisfies the relationship of |f/f3|<2. A fourth aspheric lens element 1004 has refractive power. A focal length (f4) of the fourth lens element 1004 and a focal length (f) of the optical system satisfies the relationship of |f/f4|<2.5. A fifth lens element 1005 has refractive power, has a meniscus shape in the paraxial region and/or an aspheric form for both the object-side surface and the image-side surface. At least one of the refractive lens elements may be formed of lightweight polymer or plastic material. An aperture stop 1030 may be located in the lens system 1010 at the first lens element 1001 (or between the first and second lens elements 1001, 1002) for controlling the brightness of the camera 1000. Note that the power order, shape, or other optical characteristics of the refractive lens elements may be different in some embodiments, and some embodiments may include more or fewer refractive lens elements.

In some embodiments, the camera 1000 includes two right-angle prisms 1041 and 1042 to change the direction of the light passing through the camera 1000. In some embodiments, one or both of the prisms 1041, 1042 may be shifted or tilted relative to the position of the lens system 1010 to provide autofocus and/or OIS functionality for the camera 1000. In some embodiments, the aperture stop 1030 is integrated in the lens system 1010 to control brightness in the camera 1000. Integrating the stop 1030 in the lens system 1010 enables the lens system 1010 to be isolated from and moved independently with relation to the prisms 1041 and 1042. In some embodiments, the aperture stop 1030 may be fixed; the diameter of the stop 1030 may be chosen according to system requirements. However, in some embodiments, the aperture stop may be adjustable.

In some embodiments, the camera 1000 includes an IR filter 1050, for example located between the second prism 1042 and photosensor 1020 as depicted in FIG. 10, to reduce or eliminate interference of environmental noises on the sensor 1020.

Camera 1000 Z-height is sensitive to barrel 1012 diameter. In some embodiments, to provide a desired Z-height for a particular camera 1000 application, the structure of the barrel 1012 may be modified. For example, in various embodiments of a camera 1000, the barrel 1012 may be truncated, may be tapered, may be single-sided, and/or may have a reverse assembly structure.

FIG. 11 is a diagram illustrating a third example of a lens system that includes five refractive lens elements to be positioned between a first light folding element (a first prism) and a second light folding element (a second prism), according to some embodiments. A camera 1100 may include a photosensor 1120, two light folding elements (e.g., prisms 1141 and 1142), and an independent lens system 1110 located between the two prisms 1141 and 1142 that includes an aperture stop 1130 and lens elements with refractive power to be mounted in a lens barrel (not shown, see e.g., FIG. 10). The prisms provide a "folded" optical axis for the camera 1100, for example to reduce the Z-height of the camera 1100. The lens system 1110 includes an aperture stop 1130 to control system brightness while maintaining an integrated lens system that is independent of the two prisms 1141 and 1142. The camera 1100 may, but does not necessarily, include an infrared (IR) filter 1150, for example located between the second prism 1142 and the photosensor 1120.

The example lens system 1110 shown in FIG. 11 includes a lens stack having five refractive elements 1101-1105 that provide a low F-number (<=F/3.5, such as in a range of 2.8 to 3.5), 4~6× optical zoom, and high resolution imaging. Lens element 1101 has positive refractive power for converging light and an aspheric shape to correct spherical aberration, having an Abbe number that is greater than 50. Lens element 1102 has negative refractive power, having an Abbe number that is less than 30. Lens element 1103 has a meniscus shape and has a convex object-side surface in a paraxial region and a concave image-side surface in the paraxial region, to correct field curvature and astigmatism. Lens element 1104 has refractive power. Lens element 1105 has refractive power, having a meniscus shape in the paraxial region and/or having an aspheric form for both the object-side surface and the image-side surface.

In some embodiments, the lens system 1110 may be shifted along AX 2 independently of the two prisms 1141 and 1142 to allow refocusing of the lens system 1110 between Infinity conjugate and Macro (e.g., one meter) conjugate. In some embodiments, the lens system 1110 may be shifted on one or more axes orthogonal to AX 2 to provide OIS functionality for the camera 1100. In various embodiments, lens elements 1101, 1102, 1103, 1104, and/or 1105 may be round/circular or rectangular, or some other shape. Note that in various embodiments, a lens system 1110 may include more or fewer refractive lens elements, and the lens elements may be configured or arranged differently.

In some embodiments, one or both of the prisms 1141 and 1142 may be shifted independently of the lens system 1110 along one or more axes by a mechanical actuator mechanism to facilitate autofocus functionality for the lens system 1110. In some embodiments, one or both of the prisms 1141 and 1142 may be translated with respect to the second axis (AX 2) independently of the lens system 1110 and/or tilted with respect to the second axis (AX 2) independently of the lens system 1142 by a mechanical actuator mechanism, for example to provide OIS functionality for the camera 1110 or to shift the image formed at an image plane 1121 at the photosensor 1120.

FIG. 12A is a graph illustrating a modulation transfer function (MTF) for a lens system 1110 as illustrated in FIG. 11 at infinity conjugate. FIG. 12B shows longitudinal spherical aberration, astigmatic field curves, and distortion for a lens system 1110 as illustrated in FIG. 11 at infinity conjugate.

FIG. 13A is a graph illustrating a modulation transfer function (MTF) for a lens system 1110 as illustrated in FIG. 11 at macro (e.g., one meter) conjugate. FIG. 13B shows longitudinal spherical aberration, astigmatic field curves, and distortion for a lens system 1110 as illustrated in FIG. 11 at macro (e.g., one meter) conjugate.

FIG. 14 is a cross-sectional illustration of a fourth example of a folded camera having five refractive lens elements in the lens system, according to some embodiments. FIG. 14 shows an example camera 1400 including a prism 1441 and a mirror 1442 that "fold" the optical axis of the camera 1400 and an example embodiment of a lens system 1410 with five refractive lens elements 1401-1405 located between the prism 1441 and the mirror 1442. The prism 1441 has a refractive index satisfying Nd>1.5. The lens elements 1401-1405 are mounted in a lens barrel 1412, with an aperture stop 1430 located at or in front of the first (object side) lens element 1401 (or between the first and second lens elements 1401, 1402 in alternative embodiments). The prism 1441 folds the optical axis from a first axis (AX 1) that is parallel to the incoming light direction to a second axis (AX 2) that is orthogonal to the incoming light direction. The mirror 1442 folds the optical axis from the second axis (AX 2) that is orthogonal to the incoming light direction to a third axis (AX 3) that is parallel to the incoming light direction.

The camera 1400 also includes a photosensor 1420, and may also include an optional infrared (IR) filter 1450. A camera 1400 including an embodiment of the lens system 1410 as illustrated in FIG. 14 may, for example, be implemented in portable electronic devices such as mobile phones and tablets. Embodiments of the lens system 1410 may provide a low F-number (<=3.5, such as in a range of 2.8 to 3.5), 4~6× optical zoom, and high resolution imaging. The five refractive lens elements 1401-1405 stack to secure the desired long-telephoto lens field of view (FOV), enabling the optical zoom when pairing with a wide-angle lens and configured properly in lens materials and power configurations for correcting aberrations. In addition, it is configured so that the optical TTL is reduced without sacrificing the ability to correct aberrations across the field of view.

In some embodiments, the camera 1400 may include an actuator 1460 component or components configured to move the lens system 1410 on (parallel to) the second axis (AX 2) relative to and independently of the prism 1441 and the mirror 1442 to provide autofocus functionality for the camera 1400. In some embodiments, the actuator 1460 component(s) may instead or also be configured to move the lens system 1410 on one or more axes orthogonal to the second axis (AX 2) relative to and independently of the prism 1441 and the mirror 1442 to provide optical image stabilization (OIS) functionality for the camera 1400. Various types of mechanical, magnetic, or other actuator technology may be used in various embodiments. In some embodiments, one or both of the prism 1441 and/or the mirror 1442 may be translated with respect to the second axis (AX 2) independently of the lens system 1410 and/or tilted with respect to the second axis (AX 2) independently of the lens system 1410, for example to provide OIS functionality for the camera 1400 or to shift the image formed at an image plane 1421 at the photosensor 1420.

As shown in the example of FIG. 14, embodiments of the lens system 1410 may include five lens elements 1401-1405 with refractive power. Note, however, that some embodiments may include more or fewer refractive lens elements. In some embodiments, the combination of the two light folding elements and the lens system 1410 may provide a 35 mm equivalent focal length in the range of 85-160 mm (such as in a range of 90-160 mm) and less than 9 mm of Z-height to fit in a wide variety of portable electronics devices. With proper arrangement of materials and lens powers, embodiments of the lens system 1410 are capable of capturing high brightness photographs or video frames with near diffraction-limited image quality. In a particular embodiment for a 5× zoom design, the lens system 1410 may provide a 35 mm equivalent focal length of approximately 130 mm and an F-value that is less than 3.5. In this example embodiment, the sensor 1420 may be a 12 megapixel (12 M) sensor.

As illustrated in the example camera 1400 of FIG. 14, the lens system 1410 may include five lens elements 1401-1405 with refractive power, in order from the object side to the image side of the camera 1400. A first lens element 1401 has positive refractive power for converging light and an aspheric shape to correct spherical aberration, with an Abbe number vd that is greater than 50. A second lens element 1402 has negative refractive power, with an Abbe number vd that is less than 30. A third lens element 1403 has a meniscus shape and has a convex object-side surface in a paraxial region and a concave image-side surface in the paraxial region. The third lens element 1403 is situated in the middle of the lens stack to balance the excessive negative power as introduced by the second lens element 1402 for field curvature and astigmatism control. A focal length (f3) of the third lens element 1403 and a focal length (f) of the optical system satisfies the relationship of |f/f3|<2. A fourth lens element 1404 has refractive power. A focal length (f4) of the fourth lens element 1404 and a focal length (f) of the optical system satisfies the relationship of |f/f4|<2.5. A fifth lens element 1405 has refractive power, with a meniscus shape in the paraxial region and/or an aspheric form for both the object-side surface and the image-side surface. At least one of the refractive lens elements may be formed of lightweight polymer or plastic material. An aperture stop 1430 may be located in the lens system 1410 at the first lens element 1401 (or between the first and second lens elements 1401, 1402) for controlling the brightness of the camera 1400. Note that the power order, shape, or other optical characteristics of the refractive lens elements may be different in some embodiments, and some embodiments may include more or fewer refractive lens elements.

In some embodiments, the camera 1400 includes a right-angle prism 1441 and the mirror 1442 positioned to change the direction of the light passing through the camera 1400. In some embodiments, one or both of the prism 1441 and/or mirror 1442 may be shifted or tilted relative to the position of the lens system 1410 to provide autofocus and/or OIS functionality for the camera 1400. In some embodiments, the aperture stop 1430 is integrated in the lens system 1410 to control brightness in the camera 1400. Integrating the stop 1430 in the lens system 1410 enables the lens system 1410 to be isolated from and moved independently with relation to the prism 1441 and the mirror 1442. In some embodiments, the aperture stop 1430 may be fixed; the diameter of the stop 1430 may be chosen according to system requirements. However, in some embodiments, the aperture stop may be adjustable.

In some embodiments, the camera 1400 includes an IR filter 1450, for example located between the mirror 1442 and photosensor 1420 as depicted in FIG. 14, to reduce or eliminate interference of environmental noises on the sensor 1420.

Camera 1400 Z-height is sensitive to barrel 1412 diameter. In some embodiments, to provide a desired Z-height for a particular camera 1400 application, the structure of the barrel 1412 may be modified. For example, in various embodiments of a camera 1400, the barrel 1412 may be truncated, may be tapered, may be single-sided, and/or may have a reverse assembly structure.

FIG. 15 is a diagram illustrating a third example of a lens system that includes five refractive lens elements to be positioned between a first light folding element (a prism) and a second light folding element (a mirror), according to some embodiments. A camera 1500 may include a photosensor 1520, two light folding elements (e.g., a prism 1541 and a mirror 1542), and an independent lens system 1510 located between the prism 1541 and the mirror 1542 that includes an aperture stop 1530 and lens elements with refractive power to be mounted in a lens barrel (not shown, see e.g., FIG. 14). The prism 1541 and the mirror 1542 provide a "folded" optical axis for the camera 1500, for example to reduce the Z-height of the camera 1500. The lens system 1510 includes an aperture stop 1530 to control system brightness while maintaining an integrated lens system that is independent of the prism 1541 and the mirror 1542. The camera 1500 may, but does not necessarily, include an infrared (IR) filter 1550, for example located between the mirror 1542 and the photosensor 1520.

The example lens system 1510 shown in FIG. 15 includes a lens stack having five refractive elements 1501-1505 that provide a low F-number (<=F/3.5, such as in a range of 2.8 to 3.5), 4~6× optical zoom, and high resolution imaging. Lens element 1501 has positive refractive power for converging light and an aspheric shape to correct spherical aberration, having an Abbe number that is greater than 50. Lens element 1502 has negative refractive power, having an Abbe number that is less than 30. Lens element 1503 has a meniscus shape and has a convex object-side surface in a paraxial region and a concave image-side surface in the paraxial region, to correct field curvature and astigmatism. Lens element 1504 has refractive power. Lens element 1505 has refractive power, having a meniscus shape in the paraxial region and/or having an aspheric form for both the object-side surface and the image-side surface.

In some embodiments, the lens system 1510 may be shifted along AX 2 independently of the prism 1541 and the mirror 1542 to allow refocusing of the lens system 1510 between Infinity conjugate and Macro (e.g., one meter) conjugate. In some embodiments, the lens system 1510 may be shifted on one or more axes orthogonal to AX 2 to provide OIS functionality for the camera 1500. In various embodiments, lens elements 1501, 1502, 1503, 1504, and/or 1505 may be round/circular or rectangular, or some other shape. Note that in various embodiments, a lens system 1510 may include more or fewer refractive lens elements, and the lens elements may be configured or arranged differently.

In some embodiments, one or both of the prism 1541 and the mirror 1542 may be shifted independently of the lens system 1510 along one or more axes by a mechanical actuator mechanism to facilitate autofocus functionality for the lens system 1510. In some embodiments, one or both of the prism 1541 and the mirror 1542 may be translated with respect to the second axis (AX 2) independently of the lens system 1510 and/or tilted with respect to the second axis (AX 2) independently of the lens system 1542 by a mechanical actuator mechanism, for example to provide OIS functionality for the camera 1510 or to shift the image formed at an image plane 1521 at the photosensor 1520.

FIG. 16A is a graph illustrating a modulation transfer function (MTF) for a lens system 1510 as illustrated in FIG. 15 at infinity conjugate. FIG. 16B shows longitudinal spherical aberration, astigmatic field curves, and distortion for a lens system 1510 as illustrated in FIG. 15 at infinity conjugate.

FIG. 17A is a graph illustrating the modulation transfer function (MTF) for a lens system 1510 as illustrated in FIG. 15 at macro (e.g., one meter) conjugate. FIG. 17B shows longitudinal spherical aberration, astigmatic field curves, and distortion for a lens system 1510 as illustrated in FIG. 15 at macro (e.g., one meter) conjugate.

Example Flowchart

FIG. 18 is a flowchart of a method for capturing images using embodiments of a camera as illustrated in FIGS. 1A through 15, according to some embodiments. As indicated at 1800, light from an object field in front of the camera is received at a first light folding element such as a prism on a first axis. As indicated at 1810, the light is redirected by the first light folding element to a second axis. As indicated at 1820, the light is received through an aperture at a first lens of a lens system on the second axis. As indicated at 1830, the light is refracted by one or more lens elements of the lens system on the second axis to a second light folding element such as another prism or a mirror. As indicated at 1840, the light is redirected by the second light folding element to a third axis. As indicated at 1850, the light forms an image at an image plane at or near the surface of a sensor module on the third axis. As indicated at 1860, the image is captured by the photosensor. The lens system is independent of the light folding elements (e.g., two prisms or a prism and a mirror). The camera may include an actuator component configured to move the lens system on one or more axes independently of the light folding elements to provide autofocus and/or OIS functionality for the camera.

While not shown in FIG. 18, in some embodiments, the light may pass through an infrared filter that may for example be located between the second light folding element (e.g., a second prism or a mirror) and the photosensor. In some embodiments, the aperture stop may be fixed; the diameter of the stop may be chosen according to system requirements. However, in some embodiments, the aperture stop may be adjustable. In some embodiments, one or both of the light folding elements are fixed. However, in some embodiments, one or both of the light folding elements may be shifted or tilted with respect to the second axis and independently of the lens system.

In some embodiments, the components of the lens system referred to in FIG. 18 may be configured as illustrated in any of FIG. 2, 3, 6, 7, 10, 11, 14 or 15. However, note that variations on the examples given in the Figures are possible while achieving similar optical results.

Multifunction Device Examples

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 19A-19C illustrate a mobile device 1900 that may include one or more camera modules, in accordance with embodiments as described above. In some embodiments, the device 1900 may include one or multiple features, components, and/or functionality of embodiments described herein.

FIG. 19A illustrates that a "front" side of the device 1900 may have a touch screen 1912. The touch screen 1912 may display one or more graphics within user interface (UI) 1900. In this embodiment, as well as others described below, a user may select one or more of the graphics by making a gesture on the graphics, for example, with one or more fingers 1901 (not drawn to scale in the figure) or one or more styluses 1907 (not drawn to scale in the figure).

Device 1900 may also include one or more physical buttons, such as "home" or menu button 1915, which may be used to navigate to any application 1936 (see FIG. 19C) in a set of applications that may be executed on device 1900. Alternatively, in some embodiments, the menu button is implemented as a soft key in a graphics user interface (GUI) displayed on touch screen 1912.

In one embodiment, device 1900 includes touch screen 1912, menu button 1915, push button 1905 for powering the device on/off and locking the device, volume adjustment button(s) 1909, Subscriber Identity Module (SIM) card slot 1910, head set jack 1914, and docking/charging external port 1924. Push button 1905 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1900 also may accept verbal input for activation or deactivation of some functions through microphone 1913.

FIG. 19B illustrates that a "rear" side of the device 1900 may include a camera 1970, in accordance with some embodiments. The camera 1970, which is sometimes called an "optical sensor" for convenience, may also be known as or called an optical sensor system. The camera 1970 includes one or more camera modules, including at least one of the camera modules described herein. FIG. 19B further illustrates sensor 1964 and light source module 1975.

Referring to FIG. 19C, a block diagram illustrates that device 1900 may include memory 1902 (which may include one or more computer readable storage mediums), memory controller 1922, one or more processing units (CPU's) 1920, peripherals interface 1918, RF circuitry 1908, audio circuitry 1910, speaker 1911, touch-sensitive display system 1912, microphone 1913, input/output (I/O) subsystem 1906, other input control devices 1916, and external port 1924. Device 1900 may include one or more optical sensors 1964. These components may communicate over one or more communication buses or signal lines 1903.

It should be appreciated that device 1900 is only one example of a portable multifunction device, and that device 1900 may have more or fewer components than shown, may combine two or more components, or may have a different configuration or arrangement of the components. The various components shown in FIG. 19C may be implemented in hardware, software, or a combination of hardware and software, including one or more signal processing and/or application specific integrated circuits.

Memory 1902 may include high-speed random access memory and may also include non-volatile memory, such as one or more magnetic disk storage devices, flash memory devices, or other non-volatile solid-state memory devices. Access to memory 1902 by other components of device 1900, such as CPU 1920 and the peripherals interface 1918, may be controlled by memory controller 1922.

Peripherals interface 1918 can be used to couple input and output peripherals of the device to CPU 1920 and memory 1902. The one or more processors 1920 run or execute various software programs and/or sets of instructions stored in memory 1902 to perform various functions for device 1900 and to process data.

In some embodiments, peripherals interface 1918, CPU 1920, and memory controller 1922 may be implemented on a single chip, such as chip 1904. In some other embodiments, they may be implemented on separate chips.

RF (radio frequency) circuitry 1908 receives and sends RF signals, also called electromagnetic signals. RF circuitry 1908 converts electrical signals to/from electromagnetic signals and communicates with communications networks and other communications devices via the electromagnetic signals. RF circuitry 1908 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1910, speaker 1911, and microphone 1913 provide an audio interface between a user and device 1900. Audio circuitry 1910 receives audio data from peripherals interface 1918, converts the audio data to an electrical signal, and transmits the electrical signal to speaker 1911. Speaker 1911 converts the electrical signal to human-audible sound waves. Audio circuitry 1910 also receives electrical signals converted by microphone 1913 from sound waves. Audio circuitry 1910 converts the electrical signal to audio data and transmits the audio data to peripherals interface 1918 for processing. Audio data may be retrieved from and/or transmitted to memory 102 and/or RF circuitry 1908 by peripherals interface 1918. In some embodiments, audio circuitry 1910 also includes a headset jack (e.g., 1914, FIGS. 19A-B). The headset jack provides an interface between audio circuitry 1910 and removable audio input/output peripherals, such as output-only headphones or a headset with both output (e.g., a headphone for one or both ears) and input (e.g., a microphone).

I/O subsystem 1906 couples input/output peripherals on device 1900, such as touch screen 1912 and other input control devices 1916, to peripherals interface 1918. I/O subsystem 1906 may include display controller 1956 and one or more input controllers 1960 for other input or control devices. The one or more input controllers 1916 receive/send electrical signals from/to other input or control devices 1916. The other input control devices 1916 may include physical buttons (e.g., push buttons, rocker buttons, etc.), dials, slider switches, joysticks, click wheels, and so forth. In some alternative embodiments, input controller(s) 1960 may be coupled to any (or none) of the following: a keyboard, infrared port, USB port, and a pointer device such as a mouse. The one or more buttons (e.g., 1909, FIGS. 19A-19B) may include an up/down button for volume control of speaker 1911 and/or microphone 1913. The one or more buttons may include a push button (e.g., 1906, FIGS. 19A-B).

Touch-sensitive display 1912 provides an input interface and an output interface between the device and a user. Display controller 1956 receives and/or sends electrical signals from/to touch screen 1912. Touch screen 1912 displays visual output to the user. The visual output may include graphics, text, icons, video, and any combination thereof (collectively termed "graphics"). In some embodiments, some or all of the visual output may correspond to user-interface objects.

Touch screen 1912 has a touch-sensitive surface, sensor or set of sensors that accepts input from the user based on haptic and/or tactile contact. Touch screen 1912 and display controller 1956 (along with any associated modules and/or sets of instructions in memory 1902) detect contact (and any movement or breaking of the contact) on touch screen 1912 and converts the detected contact into interaction with user-interface objects (e.g., one or more soft keys, icons, web pages or images) that are displayed on touch screen 1912. In an example embodiment, a point of contact between touch screen 1912 and the user corresponds to a finger of the user.

Touch screen 1912 may use LCD (liquid crystal display) technology, LPD (light emitting polymer display) technology, or LED (light emitting diode) technology, although other display technologies may be used in other embodiments. Touch screen 1912 and display controller 1956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1912. In an example embodiment, projected mutual capacitance sensing technology may be used.

Touch screen 1912 may have a video resolution in excess of 100 dots per inch (dpi). In some embodiments, the touch screen has a video resolution of approximately 160 dpi. The user may make contact with touch screen 1912 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1912 or an extension of the touch-sensitive surface formed by the touch screen.

Device 1900 also includes power system 1962 for powering the various components. Power system 1962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation management and distribution of power in portable devices.

Device 1900 may also include one or more optical sensors 1964 and one or more cameras 1970. FIG. 19C shows an optical sensor coupled to optical sensor controller 1958 in I/O subsystem 1906. Optical sensor 1964 may include charge-coupled device (CCD) or complementary metal-oxide semiconductor (CMOS) phototransistors. Optical sensor 1964 receives light from the environment, projected through one or more lens, and converts the light to data representing an image. In conjunction with camera(s) 1970 (such as an embodiment of a camera module described herein), optical sensor 1964 may capture still images or video. In some embodiments, an optical sensor is located on the back of device 1900, opposite touch screen display 1912 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1900 may also include one or more proximity sensors 1966. FIG. 19C shows proximity sensor 1966 coupled to peripherals interface 1918. Alternatively, proximity sensor 1966 may be coupled to input controller 1960 in I/O subsystem 1906. In some embodiments, the proximity sensor turns off and disables touch screen 1912 when the multifunction device is placed near the user's ear (e.g., when the user is making a phone call).

Device 1900 includes one or more orientation sensors 1968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1900. In some embodiments, the one or more orientation sensors include any combination of orientation/rotation sensors. FIG. 19C shows the one or more orientation sensors 1968 coupled to peripherals interface 1918. Alternatively, the one or more orientation sensors 1968 may be coupled to an input controller 1960 in I/O subsystem 1906. In some embodiments, information is displayed on the touch screen display in a portrait view or a landscape view based on an analysis of data received from the one or more orientation sensors.

In some embodiments, the software components stored in memory 1902 include operating system 1926, communication module (or set of instructions) 1928, instructions). Furthermore, in some embodiments memory 1902 stores device/global internal state, including information obtained from the device's various sensors and input control devices 1916; and location information concerning the device's location and/or attitude.

Operating system 1926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1928 facilitates communication with other devices over one or more external ports 1924 and also includes various software components for handling data received by RF circuitry 1908 and/or external port 1924. External port 1924 (e.g., Universal Serial Bus (USB), FIREWIRE, etc.) is adapted for coupling directly to other devices or indirectly over a network (e.g., the Internet, wireless LAN, etc.).

Contact/motion module 1930 may detect contact with touch screen 1912 (in conjunction with display controller 1956) and other touch sensitive devices (e.g., a touchpad or physical click wheel). Contact/motion module 1930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1930 and display controller 1956 detect contact on a touchpad.

Contact/motion module 1930 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1932 includes various known software components for rendering and displaying graphics on touch screen 1912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1932 stores data representing graphics to be used. Each graphic may be assigned a corresponding code. Graphics module 1932 receives, from applications etc., one or more codes specifying graphics to be displayed along with, if necessary, coordinate data and other graphic property data, and then generates screen image data to output to display controller 1956.

Text input module 1934, which may be a component of graphics module 1932, provides soft keyboards for entering text in various applications (e.g., contacts 1937, e-mail 1940, IM 1941, browser 1947, and any other application that needs text input).

GPS module 1935 determines the location of the device and provides this information for use in various applications (e.g., to telephone 1938 for use in location-based dialing, to imaging module 1943 as picture/video metadata, and to applications that provide location-based services such as weather widgets, local yellow page widgets, and map/navigation widgets).

Applications 1936 may include the following modules (or sets of instructions), or a subset or superset thereof:

contacts module 1937 (sometimes called an address book or contact list);
 telephone module 1938;
 video conferencing module 1939;
 e-mail client module 1940;
 instant messaging (IM) module 1941;
 workout support module 1942;
 camera module 1943 for still and/or video images;
 image management module 1944;
 browser module 1947;

calendar module 1948;
 widget modules 1949, which may include one or more of: weather widget 1949-1, stocks widget 1949-2, calculator widget 1949-3, alarm clock widget 1949-4, dictionary widget 1949-5, and other widgets obtained by the user, as well as user-created widgets 1949-6;
 widget creator module 1950 for making user-created widgets 1949-6;
 search module 1951;
 video and music player module 1952, which may be made up of a video player
 module and a music player module;
 notes module 1953;
 map module 1954; and/or
 online video module 1955.

Examples of other applications 1936 that may be stored in memory 1902 include other word processing applications, other image editing applications, drawing applications, presentation applications, JAVA-enabled applications, encryption, digital rights management, voice recognition, and voice replication.

In conjunction with touch screen 1912, display controller 1956, contact module 1930, graphics module 1932, and text input module 1937 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1938, video conference 1939, e-mail 1940, or IM 1941; and so forth.

In conjunction with RF circuitry 1908, audio circuitry 1910, speaker 1911, microphone 1913, touch screen 1912, display controller 1956, contact module 1930, graphics module 1932, and text input module 1934, telephone module 1938 may be used to enter a sequence of characters corresponding to a telephone number, access one or more telephone numbers in address book 1937, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1908, audio circuitry 1910, speaker 1911, microphone 1913, touch screen 1912, display controller 1956, optical sensor 1964, optical sensor controller 1958, contact module 1930, graphics module 1932, text input module 1934, contact list 1937, and telephone module 1938, videoconferencing module 1939 includes executable instructions to initiate, conduct, and terminate a video conference between a user and one or more other participants in accordance with user instructions.

In conjunction with RF circuitry 1908, touch screen 1912, display controller 1956, contact module 1930, graphics module 1932, and text input module 1934, e-mail client module 1940 includes executable instructions to create, send, receive, and manage e-mail in response to user instructions. In conjunction with image management module 1944, e-mail client module 1940 makes it very easy to create and send e-mails with still or video images taken by imaging module 1943.

In conjunction with RF circuitry 1908, touch screen 1912, display controller 1956, contact module 1930, graphics module 1932, and text input module 1934, the instant messaging module 1941 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1908, touch screen 1912, display controller 1956, contact module 1930, graphics module 1932, text input module 1934, GPS module 1935, map module 1954, and music player module 1946, workout support module 1942 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1912, display controller 1956, optical sensor(s) 1964, camera(s) 1970, optical sensor controller 1958, light source module 1975 (see FIG. 19B), contact module 1930, graphics module 1932, and image management module 1944, imaging module 1943 includes executable instructions to capture still images or video (including a video stream) and store them into memory 1902, modify characteristics of a still image or video, or delete a still image or video from memory 1902.

In conjunction with touch screen 1912, display controller 1956, optical sensor(s) 1964, camera(s) 1970, contact module 1930, graphics module 1932, text input module 1934, light source module 1975 (see FIG. 19B), and imaging module 1943, image management module 1944 includes executable instructions to arrange, modify (e.g., edit), or otherwise manipulate, label, delete, present (e.g., in a digital slide show or album), and store still and/or video images.

In conjunction with RF circuitry 1908, touch screen 1912, display system controller 1956, contact module 1930, graphics module 1932, and text input module 1934, browser module 1947 includes executable instructions to browse the Internet in accordance with user instructions, including searching, linking to, receiving, and displaying web pages or portions thereof, as well as attachments and other files linked to web pages.

In conjunction with RF circuitry 1908, touch screen 1912, display system controller 1956, contact module 1930, graphics module 1932, text input module 1934, e-mail client module 1940, and browser module 1947, calendar module 1948 includes executable instructions to create, display, modify, and store calendars and data associated with calendars (e.g., calendar entries, to do lists, etc.) in accordance with user instructions.

In conjunction with RF circuitry 1908, touch screen 1912, display system controller 1956, contact module 1930, graphics module 1932, text input module 1934, and browser module 1947, widget modules 1949 are mini-applications that may be downloaded and used by a user (e.g., weather widget 1949-1, stocks widget 1949-2, calculator widget 1949-3, alarm clock widget 1949-4, and dictionary widget 1949-5) or created by the user (e.g., user-created widget 1949-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1908, touch screen 1912, display system controller 1956, contact module 1930, graphics module 1932, text input module 1934, and browser module 1947, the widget creator module 1950 may be used by a user to create widgets (e.g., turning a user-specified portion of a web page into a widget).

In conjunction with touch screen 1912, display system controller 1956, contact module 1930, graphics module 1932, and text input module 1934, search module 1951 includes executable instructions to search for text, music, sound, image, video, and/or other files in memory 1902 that match one or more search criteria (e.g., one or more user-specified search terms) in accordance with user instructions.

In conjunction with touch screen 1912, display system controller 1956, contact module 1930, graphics module 1932, audio circuitry 1910, speaker 1911, RF circuitry 1908, and browser module 1947, video and music player module 1952 includes executable instructions that allow the user to download and play back recorded music and other sound files stored in one or more file formats, such as MP3 or AAC files, and executable instructions to display, present or otherwise play back videos (e.g., on touch screen 1912 or on an external, connected display via external port 1924). In some embodiments, device 1900 may include the functionality of an MP3 player.

In conjunction with touch screen 1912, display controller 1956, contact module 1930, graphics module 1932, and text input module 1934, notes module 1953 includes executable instructions to create and manage notes, to do lists, and the like in accordance with user instructions.

In conjunction with RF circuitry 1908, touch screen 1912, display system controller 1956, contact module 1930, graphics module 1932, text input module 1934, GPS module 1935, and browser module 1947, map module 1954 may be used to receive, display, modify, and store maps and data associated with maps (e.g., driving directions; data on stores and other points of interest at or near a particular location; and other location-based data) in accordance with user instructions.

In conjunction with touch screen 1912, display system controller 1956, contact module 1930, graphics module 1932, audio circuitry 1910, speaker 1911, RF circuitry 1908, text input module 1934, e-mail client module 1940, and browser module 1947, online video module 1955 includes instructions that allow the user to access, browse, receive (e.g., by streaming and/or download), play back (e.g., on the touch screen or on an external, connected display via external port 1924), send an e-mail with a link to a particular online video, and otherwise manage online videos in one or more file formats, such as H.264. In some embodiments, instant messaging module 1941, rather than e-mail client module 1940, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1902 may store a subset of the modules and data structures identified above. Furthermore, memory 1902 may store additional modules and data structures not described above.

In some embodiments, device 1900 is a device where operation of a predefined set of functions on the device is performed exclusively through a touch screen and/or a touchpad. By using a touch screen and/or a touchpad as the primary input control device for operation of device 1900, the number of physical input control devices (such as push buttons, dials, and the like) on device 1900 may be reduced.

The predefined set of functions that may be performed exclusively through a touch screen and/or a touchpad include navigation between user interfaces. In some embodiments, the touchpad, when touched by the user, navigates device 1900 to a main, home, or root menu from any user interface that may be displayed on device 1900. In such embodiments, the touchpad may be referred to as a "menu button." In some other embodiments, the menu button may be a physical push button or other physical input control device instead of a touchpad.

Example Computing Device

FIG. 20 illustrates an example computing device, referred to as computer system 2000, that may include or host embodiments of a camera with a lens system as illustrated in FIGS. 1A through 18. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, hand-held video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1A through 18, which may also be coupled to I/O interface 2030, or one or more cameras as described above with respect to FIGS. 1A through 18 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 20, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:

a first light folding element;

a second light folding element; and a lens system located between the first light folding element and the second light folding element, wherein the lens system includes a lens stack having either four or five lens elements with refractive power;

wherein the first light folding element redirects light from an object field from a first axis to the lens system on a second axis;

wherein the refractive lens elements in the lens stack refract the light to the second light folding element, wherein the lens stack has only four or five refractive lens elements having, in a consecutive order from an object side of the lens system to an image side of the lens system:

a first lens element having an object-side surface, wherein the object-side surface of the first lens element has a shape consisting of one or more convex shapes, a second lens element, a third lens element having an object-side surface, wherein, when the lens stack has only four lens elements with refractive power, the object-side surface of the third lens element has a shape consisting of one or more concave shapes, and a fourth lens element having an object-side surface, wherein the object-side surface of the fourth lens element has a shape consisting of one or more convex shapes;

wherein the second light folding element redirects the light from the second axis onto a third axis to form an image of the object field at an image plane; and wherein the optical system has a 35 mm equivalent focal length within a range of 85 mm to 160 mm.

2. The optical system of claim 1, wherein the lens system has an F-number within a range of 2.8 to 3.5.

3. The optical system as recited in claim 1, wherein the first light folding element is a first prism, and wherein the second light folding element is a second prism.

4. The optical system as recited in claim 3, wherein:

the first lens element has positive refractive power for converging light and an aspheric shape to correct spherical aberration, the first lens element having an Abbe number that is greater than 50;

the second lens element has negative refractive power and a meniscus shape to correct field curvature, the second lens element having an Abbe number that is less than 30; and the third lens element has a meniscus shape.

5. The optical system as recited in claim 1, wherein the first light folding element is a prism, and wherein the second light folding element is a mirror.

6. The optical system as recited in claim 5, wherein the lens stack has four lens elements with refractive power, in the consecutive order from the object side of the lens system to the image side of the lens system:

the first lens element, wherein the first lens element has positive refractive power for converging light and an aspheric shape to correct spherical aberration, the first lens element having an Abbe number that is greater than 50;

the second lens element, wherein the second lens element has negative refractive power and a meniscus shape to correct field curvature, the second lens element having an Abbe number that is less than 30;

the third lens element, wherein the third lens element has a meniscus shape; and a fourth lens element with refractive power.

7. The optical system as recited in claim 1, wherein the lens system includes an aperture stop positioned between a front surface of a first refractive lens element located on an object side of the lens system and a front surface of a second refractive lens element of the lens system.

8. The optical system as recited in claim 1, wherein the first light folding element is a prism having a refractive index that is greater than 1.5.

9. The optical system as recited in claim 1, wherein the second light folding element is a prism having a refractive index that is greater than 1.5.

10. A camera, comprising:

a photosensor configured to capture light projected onto a surface of the photosensor;

a first light folding element that redirects light received from an object field from a first axis to a second axis;

a lens system that includes a lens stack having either four or five lens elements with refractive power that refract the light on the second axis such that the camera has a 35 mm equivalent focal length within a range of 85 mm to 160 mm, wherein the lens stack has only four or five refractive lens elements having, in a consecutive order from an object side of the lens system to an image side of the lens system:

a first lens element having an object-side surface, wherein the object-side surface of the first lens element has a shape consisting of one or more convex shapes, a second lens element, and a third lens element having an object-side surface, wherein, when the lens stack has only four lens elements with refractive power, the object-side surface of the third lens element has a shape consisting of one or more concave shapes, and a fourth lens element having an object-side surface, wherein the object side surface of the fourth lens element has a shape consisting of one or more convex shapes; and a second light folding element that redirects the light refracted by the lens system from the second axis to a third axis to form an image of the object field at an image plane at or near a surface of the photosensor.

11. The camera as recited in claim 10, wherein the first light folding element is a first prism, and wherein the second light folding element is a second prism.

12. The camera as recited in claim 10, wherein:

the first lens element has positive refractive power for converging light and an aspheric shape to correct spherical aberration, the first lens element having an Abbe number that is greater than 50;

the second lens element has negative refractive power and a meniscus shape to correct field curvature, the second lens element having an Abbe number that is less than 30; and the third lens element has a meniscus shape.

13. The camera as recited in claim 10, wherein the first light folding element is a prism, and wherein the second light folding element is a mirror.

14. The camera as recited in claim 13, wherein the lens stack has four lens elements with refractive power, in the consecutive order from the object side of the lens system to the image side of the lens system:

the first lens element, wherein the first lens element has positive refractive power for converging light and an aspheric shape to correct spherical aberration, the first lens element having an Abbe number that is greater than 50;

the second lens element, wherein the second lens element has negative refractive power and a meniscus shape to correct field curvature, the second lens element having an Abbe number that is less than 30;

the third lens element, wherein the third lens element has a meniscus shape; and a fourth lens element with refractive power.

15. The camera as recited in claim 10, wherein the lens system includes an aperture stop positioned between a front surface of the first lens element located on an object side of the lens system and a front surface of the second lens element of the lens system.

16. The camera as recited in claim 10, further comprising an actuator to move at least one of the lens system or the photosensor.

17. The camera as recited in claim 10, wherein the first light folding element is a prism having a refractive index that is greater than 1.5.

18. The camera as recited in claim 10, wherein the second light folding element is a prism having a refractive index that is greater than 1.5.

19. A device, comprising:

one or more processors;

one or more cameras; and a memory comprising program instructions executable by at least one of the one or more processors to control operations of the one or more cameras;

wherein at least one of the one or more cameras is a camera comprising:

a photosensor configured to capture light projected onto a surface of the photosensor;

a first light folding element that redirects light received from an object field from a first axis to a second axis;

a lens system that includes a lens stack having either four or five lens elements with refractive power that refract the light on the second axis such that the at least one camera has a 35 mm equivalent focal length within a range of 85 mm to 160 mm, wherein the lens stack has only four or five refractive lens elements having, in a consecutive order from an object side of the lens system to an image side of the lens system:

a first lens element having an object-side surface, wherein the object-side surface of the first lens element has a shape consisting of one or more convex shapes, a second lens element, a third lens element having an object-side surface, wherein, when the lens stack has only four lens elements with refractive power, the object-side surface of the third lens element has a shape consisting of one or more concave shapes, and a fourth lens element having an object-side surface, wherein the object-side surface of the fourth lens element has a shape consisting of one or more convex shapes; and a second light folding element that redirects the light refracted by the lens system from the second axis to a third axis to form an image of the object field at an image plane at or near a surface of the photosensor.

20. The device as recited in claim 19, wherein the at least one camera has an F-number within a range of 2.8 to 3.5.

21. The device as recited in claim 19, wherein the first light folding element is a prism, and wherein the second light folding element is either another prism or a mirror.

22. The device as recited in claim 19, wherein the first light folding element is a prism having a refractive index that is greater than 1.5.

23. The device as recited in claim 19, wherein the second light folding element is a prism having a refractive index that is greater than 1.5.

\* \* \* \* \*